(12) United States Patent
Nagase et al.

(10) Patent No.: US 9,495,799 B2
(45) Date of Patent: Nov. 15, 2016

(54) IMAGE DISTORTION CORRECTION SYSTEM

(71) Applicant: BANDAI NAMCO ENTERTAINMENT INC., Tokyo (JP)

(72) Inventors: Jun Nagase, Chigasaki (JP); Takahiro Kakizawa, Yokohama (JP);
(Continued)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 16 days.

(21) Appl. No.: 14/226,045

(22) Filed: Mar. 26, 2014

(65) Prior Publication Data

US 2014/0292755 A1 Oct. 2, 2014

(30) Foreign Application Priority Data

Mar. 29, 2013 (JP) .................................. 2013-075247

(51) Int. Cl.
*G06T 17/20* (2006.01)
*G06T 15/20* (2011.01)

(52) U.S. Cl.
CPC ............... *G06T 17/20* (2013.01); *G06T 15/20* (2013.01)

(58) Field of Classification Search
CPC .................................. G06T 15/08; G06T 3/005
(Continued)

(56) References Cited

U.S. PATENT DOCUMENTS

| 4,763,280 A | 8/1988 | Robinson et al. |
| 2003/0011535 A1 | 1/2003 | Kikuchi et al. |

(Continued)

FOREIGN PATENT DOCUMENTS

| JP | A-2003-30677 | 1/2003 |
| JP | A-2003-85586 | 3/2003 |

(Continued)

OTHER PUBLICATIONS

Author:Justin Jang, Christopher D. Shaw, N.Faust and Nickolas Faust; Title:View-dependent multiresolution splatting of non-uniform data; publisher:ResearchGate. Article Jan. 2002.*

(Continued)

*Primary Examiner* — Zhengxi Liu
*Assistant Examiner* — Yanna Wu
(74) *Attorney, Agent, or Firm* — Oliff PLC

(57) ABSTRACT

An image generation system includes a vertex split count setting section that performs a vertex split count setting process that sets a vertex split count m, a vertex split processing section that performs a vertex split process on a three-dimensional object OB in an object space using the vertex split count m, a vertex position calculation section that calculates an intersection position of a projection screen SC and a straight line that connects a vertex position of the three-dimensional object OB after the vertex split process and a position of a virtual camera VC, and calculates a vertex position of a drawing object corresponding to the three-dimensional object OB on a drawing buffer based on the calculated intersection position, and a drawing section that draws the drawing object on the drawing buffer based on the vertex position of the drawing object to generate a projection image.

8 Claims, 20 Drawing Sheets

(72) Inventors: Motonaga Ishii, Tokyo (JP); Tohru Kikuchi, Kawasaki (JP)

(58) Field of Classification Search
USPC .......................................................... 345/423
See application file for complete search history.

(56) References Cited

U.S. PATENT DOCUMENTS

| | | | |
|---|---|---|---|
| 2004/0075654 A1* | 4/2004 | Hsiao | G06T 15/40 |
| | | | 345/418 |
| 2009/0237401 A1 | 9/2009 | Wei et al. | |

FOREIGN PATENT DOCUMENTS

| | | |
|---|---|---|
| JP | A-2011-515765 | 5/2011 |
| WO | WO 2009/117619 A1 | 9/2009 |

OTHER PUBLICATIONS

Search Report issued in British Application No. 1405619.6 dated Sep. 29, 2014.

* cited by examiner

IMAGE DISTORTION CORRECTION SYSTEM

Japanese Patent Application No. 2013-075247 filed on Mar. 29, 2013, is hereby incorporated by reference in its entirety.

BACKGROUND

The present invention relates to an image generation system, an image generation method, an information storage medium, and the like.

A system has been known that generates a projection image that is projected onto a curved screen using a projection device (e.g., projector). For example, JP-A-2003-85586 discloses a technique that projects a projection image with a small amount of distortion onto a curved screen.

A graphics processing unit (GPU) having a shader function may be provided with a tessellation function. For example, JP-T-2011-515765 discloses such a tessellation technique. However, a technique has not been proposed that utilizes a vertex splitvertex split process using tessellation or the like to correct distortion of a projection image projected onto a projection screen (e.g., curved screen).

SUMMARY

According to one aspect of the invention, there is provided an image generation system comprising:

a vertex splitvertex split count setting section that performs a vertex split count setting process that sets a vertex split count;

a vertex split processing section that performs a vertex split process on a three-dimensional object in an object space using the vertex split count set by the vertex split count setting section;

a vertex position calculation section that calculates an intersection position of a projection screen and a straight line that connects a vertex position of the three-dimensional object after the vertex split process and a position of a virtual camera, and calculates a vertex position of a drawing object corresponding to the three-dimensional object on a drawing buffer based on the calculated intersection position; and a drawing section that draws the drawing object on the drawing buffer based on the calculated vertex position of the drawing object to generate a projection image.

According to another aspect of the invention, there is provided an image generation method comprising:

performing a vertex split count setting process that sets a vertex split count;

performing a vertex split process on a three-dimensional object in an object space using the vertex split count set by the vertex split count setting process;

calculating an intersection position of a projection screen and a straight line that connects a vertex position of the three-dimensional object after the vertex split process and a position of a virtual camera, and calculating a vertex position of a drawing object corresponding to the three-dimensional object on a drawing buffer based on the calculated intersection position; and drawing the drawing object on the drawing buffer based on the calculated vertex position of the drawing object to generate a projection image.

According to another aspect of the invention, there is provided a computer-readable information storage medium storing a program that causes a computer to execute the above image generation method.

BRIEF DESCRIPTION OF THE DRAWINGS

FIG. 11 illustrates a configuration example of a GPU that is provided with a tessellator and the like.

DESCRIPTION OF EXEMPLARY EMBODIMENTS

Figure 1:
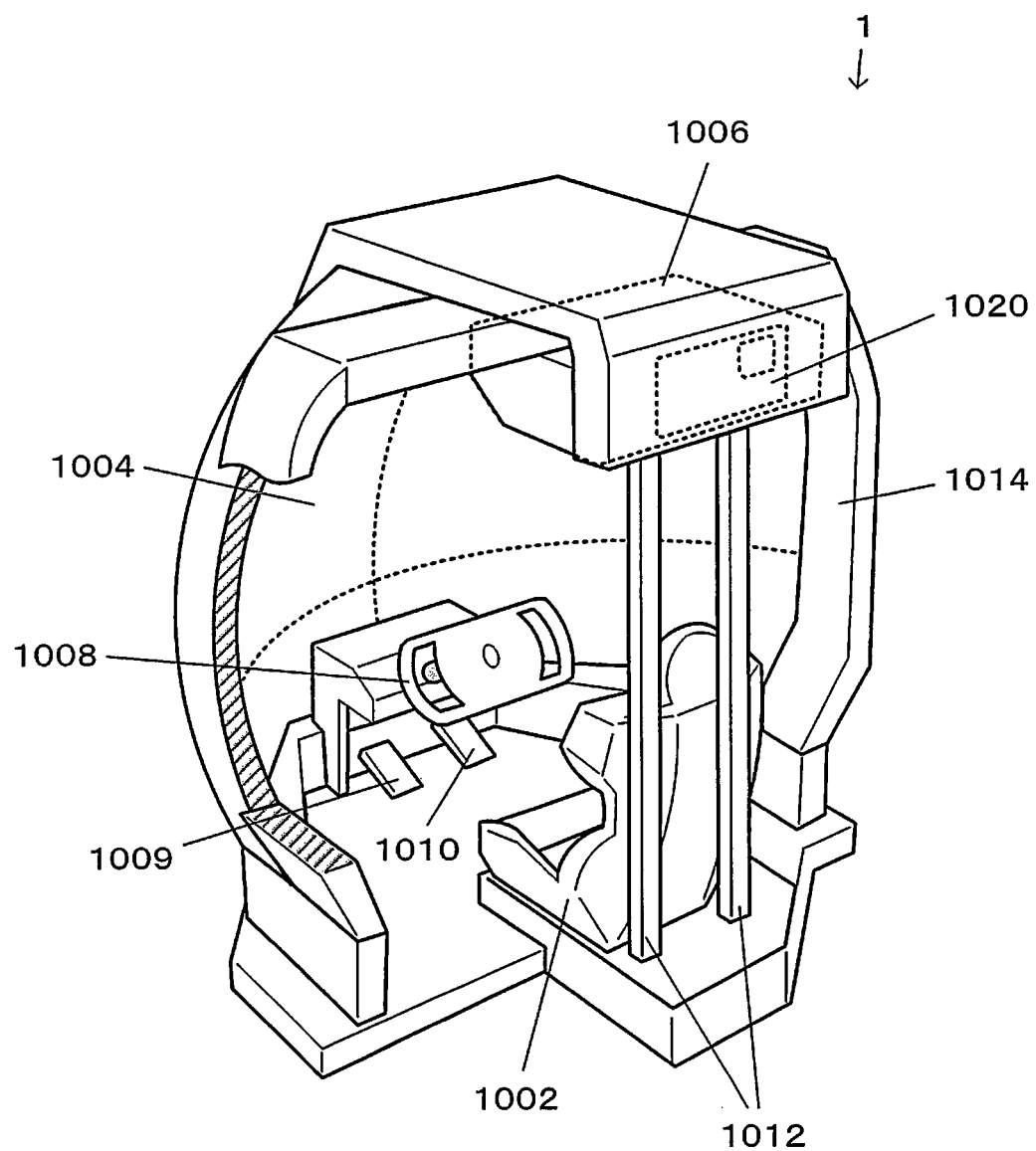
FIG. 1 illustrates an example of a game system to which an image generation system according to one embodiment of the invention is applied.

Several aspects of the invention may provide an image generation system, an image generation method, an information storage medium, and the like that can correct distortion of a projection image by effectively utilizing a vertex split process.

According to one embodiment of the invention, there is provided an image generation system comprising:

a vertex split count setting section that performs a vertex split count setting process that sets a vertex split count;

a vertex split processing section that performs a vertex split process on a three-dimensional object in an object space using the vertex split count set by the vertex split count setting section;

a vertex position calculation section that calculates an intersection position of a projection screen and a straight line that connects a vertex position of the three-dimensional object after the vertex split process and a position of a virtual camera, and calculates a vertex position of a drawing object corresponding to the three-dimensional object on a drawing buffer based on the calculated intersection position; and a drawing section that draws the drawing object on the drawing buffer based on the calculated vertex position of the drawing object to generate a projection image.

According to the above configuration, the vertex position of the drawing object on the drawing buffer is calculated based on the vertex position of the three-dimensional object after the vertex split process, and the drawing object corresponding to the three-dimensional object is drawn on the drawing buffer to generate the projection image. For example, since a straight line is drawn on the drawing buffer corresponding to a straight line in the object space, it is possible to prevent a situation in which a distorted image is observed. It is thus possible to provide an image generation system and the like that can correct distortion of a projection image by effectively utilizing a vertex split process.

In the image generation system, two vertices that form a line segment included in the three-dimensional object subjected to the vertex split process may be referred to as a first vertex and a second vertex, an angle formed by a first straight line that connects the first vertex and the position of the virtual camera, and a second straight line that connects the second vertex and the position of the virtual camera may be referred to as θ, and the vertex split count may be referred to as m, and the vertex split count setting section may set the vertex split count m based on the angle θ.

The above configuration makes it possible to implement the vertex split count setting process that increases the vertex split count m when the angle θ is large, and decreases the vertex split count when the angle θ is small, for example. Therefore, distortion of the projection image can be appropriately corrected while suppressing occurrence of unnecessary processing load.

In the image generation system, the vertex split count setting section may set the vertex split count m to a first split count m1 when the angle θ is a first angle θ1, and may set the vertex split count m to a second split count m2 (m2≤m1) when the angle θ is a second angle θ2 (θ2<θ1).

The above configuration makes it possible to implement the vertex split count setting process that increases the vertex split count for the three-dimensional object that is disposed at a position close to the virtual camera, and decreases the vertex split count for the three-dimensional object that is disposed at a position away from the virtual camera, for example.

In the image generation system, the vertex split count setting section may change the vertex split count m with respect to the angle θ corresponding to at least one of a projection position of a vertex of the three-dimensional object subjected to the vertex split process with respect to the screen, position information about the virtual camera, temporal change information about the position information about the virtual camera, position information about a projector, temporal change information about the position information about the projector, a shape of the screen, temporal change information about the shape of the screen, a drawing load, a temporal element, and an attribute of the three-dimensional object.

The above configuration makes it possible to implement the vertex split count setting process that can flexibly deal with various situations.

In the image generation system, two vertices that form a line segment included in the three-dimensional object subjected to the vertex split process may be referred to as a first vertex and a second vertex, an angle formed by a first straight line that connects the first vertex and the position of the virtual camera, and a second straight line that connects the second vertex and the position of the virtual camera may be referred to as θ, the vertex split count may be referred to as m, and an angle that is used as a standard for setting the vertex split count may be referred to as ϵ, and the vertex split count setting section may set the vertex split count m so that $(\theta/m) < \epsilon$ is satisfied.

When the vertex split count is thus set based on the angle ϵ, it is possible to implement the vertex split count setting process using a simple process, and correct distortion of the projection image.

In the image generation system, an angle under which a size of a pixel of the projection image on the screen is seen from the position of the virtual camera may be referred to as δ, and the vertex split count setting section may set the vertex split count m using the angle ϵ that is set with respect to the angle δ.

The above configuration makes it possible to correct distortion of the projection image while appropriately reflecting the fact that the size of the pixel of the projection image on the screen differs depending on the projection position.

In the image generation system, the vertex split count setting section may change the angle ϵ corresponding to at least one of a projection position of a vertex of the three-dimensional object subjected to the vertex split process with respect to the screen, position information about the virtual camera, temporal change information about the position information about the virtual camera, position information about a projector, temporal change information about the position information about the projector, a shape of the screen, temporal change information about the shape of the screen, a drawing load, a temporal element, and an attribute of the three-dimensional object.

The above configuration makes it possible to set the angle ϵ while flexibly dealing with various situations.

In the image generation system, the drawing section may draw a screen model object that corresponds to a shape of the screen in a viewpoint coordinate system of the virtual camera to generate a depth image in which a depth value is set corresponding to each pixel or each vertex of the screen model object, and the vertex position calculation section may transform first and second coordinates of a vertex of the three-dimensional object using a projective transformation matrix with respect to the viewpoint coordinate system, and may calculate the intersection position with the screen by referring to the depth value of the depth image based on the first and second coordinates after the transformation.

The above configuration makes it possible to quickly and accurately correct distortion of the projection image when the shape of the screen is known in advance based on shape data, for example.

In the image generation system, the screen may be a screen including one curved surface or a plurality of surfaces.

Exemplary embodiments of the invention are described below. Note that the following exemplary embodiments do not in any way limit the scope of the invention laid out in the claims. Note also that all of the elements described in connection with the following exemplary embodiments should not necessarily be taken as essential elements of the invention.

1. Configuration

Figure 2:
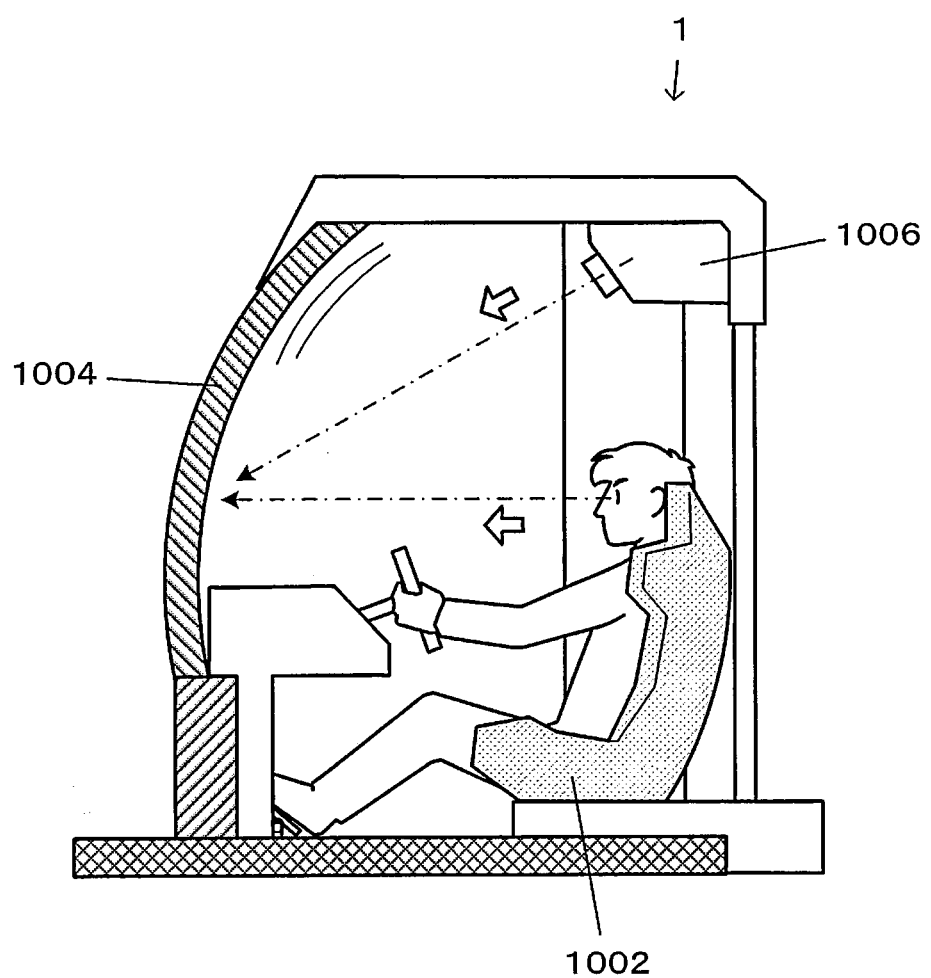
FIG. 2 is a vertical cross-sectional view illustrating a game system to which an image generation system according to one embodiment of the invention is applied.

FIG. 1 illustrates a configuration example of a game system 1 to which an image generation system according to several embodiments of the invention is applied. FIG. 2 is a vertical cross-sectional view illustrating the game system 1.

The game system 1 according to one embodiment of the invention is an arcade game system that is installed in a store or the like, and implements or executes a car racing game. The game system 1 includes a player's seat 1002 that imitates the driver's seat of a racing car, a curved screen 1004 that displays a game screen (image), a projector 1006 that projects an image onto the screen 1004, a speaker (not illustrated in the drawings) that outputs a game sound, a steering wheel 1008, an accelerator pedal 1010, a brake pedal 1009, a shift lever (not illustrated in the drawings) that allow the player to input a game operation, and a control board 1020.

The direction and the height of the player's seat 1002 are adjusted so that the presumed viewing direction of the player who sits on the player's seat 1002 intersects an area around the center of the screen 1004. In one embodiment of the invention, the frontal direction of the player who sits on the player's seat 1002 is set to be the presumed viewing direction. The curved screen 1004 is formed to be convex in the frontal direction (presumed viewing direction) of the player who sits on the player's seat 1002.

The projector 1006 (i.e., projection device) is supported by posts 1012 provided behind the player's seat 1002, and a housing frame 1014, and disposed at a position above the player's seat 1002 at which the projector 1006 does not interfere with the player who sits on the player's seat 1002 so that the projection center direction of the projector 1006 intersects an area around the center of the screen 1004. Specifically, the projector 1006 is disposed so that the projection center direction the intersects the intersection position of the presumed viewing direction of the player and the curved screen. A wide-angle lens is provided to the projector 1006 as a projection lens. A projection image is projected onto the entire plane of projection of the screen 1004 through the wide-angle lens.

The control board 1020 is provided with a microprocessor (e.g., CPU, GPU, and DSP), an ASIC, and an IC memory (e.g., VRAM, RAM, and ROM). The control board 1020 performs various processes for implementing the car racing game based on a program and data stored in the IC memory, operation signals from the steering wheel 1008, the accelerator pedal 1010, and the brake pedal 1009, and the like.

The player sits on the player's seat 1002, and enjoys the car racing game by operating the steering wheel 1006, the accelerator pedal 1010, and the brake pedal 1009 while observing the game screen displayed on the screen 1004, and hearing the game sound output from the speaker.

The car racing game according to one embodiment of the invention is designed so that a background object (e.g., racetrack) is disposed in an object space (virtual three-dimensional space) to form a game space. Various objects such as a player car operated by the player and a player car operated by another player are disposed in the object space, and a virtual camera is disposed at the viewpoint position of the player. The projector 1006 projects (displays) an image of the object space viewed from the virtual camera onto (on) the screen 1004 as a game image.

Figure 3:
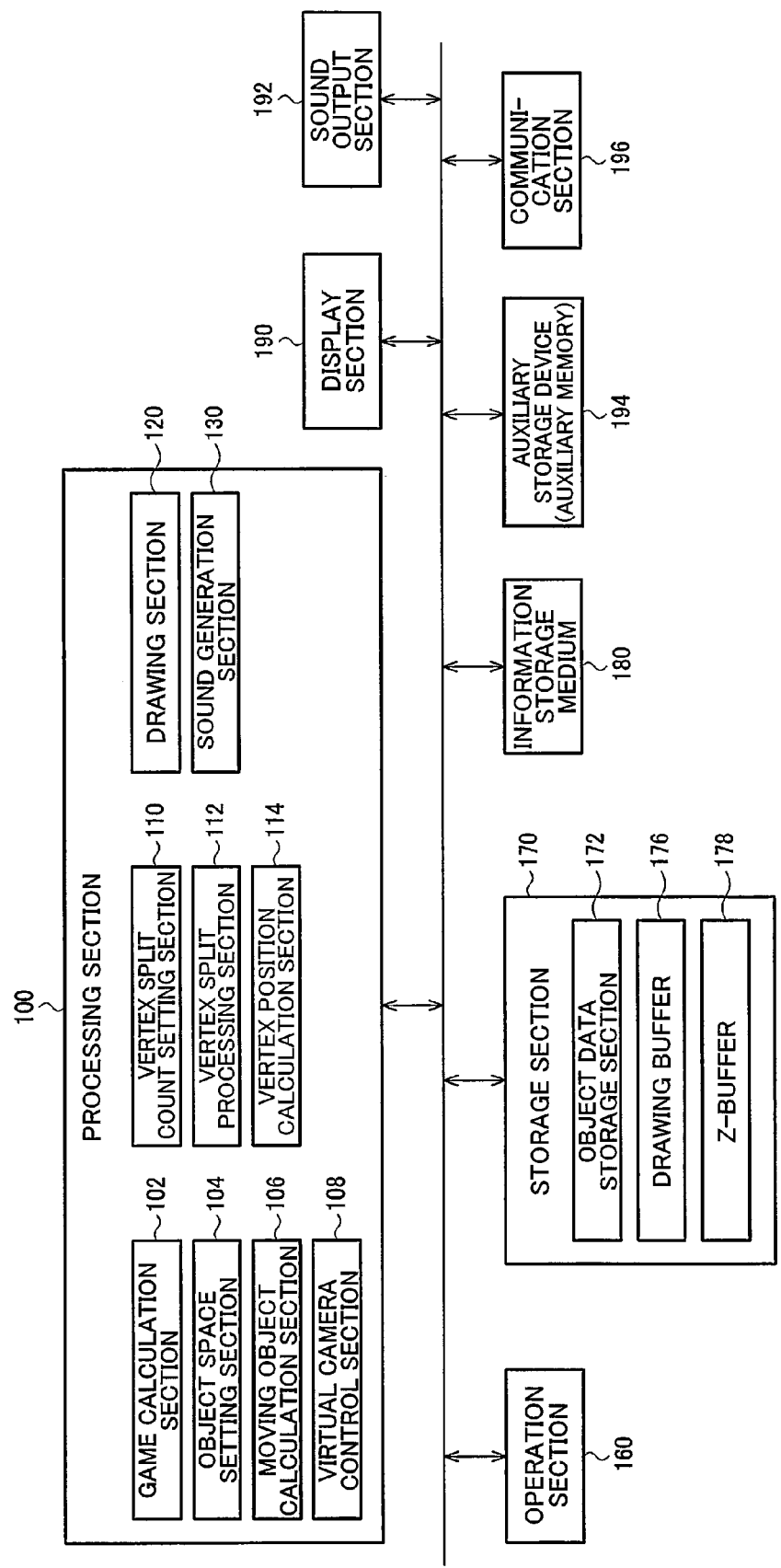
FIG. 3 illustrates a configuration example of an image generation system according to one embodiment of the invention.

FIG. 3 illustrates an example of a block diagram of the image generation system according to one embodiment of the invention. Note that the configuration of the image generation system is not limited to the configuration illustrated in FIG. 3. Various modifications may be made, such as omitting some of the elements (sections), or adding other elements.

An operation section 160 allows the player to input operation data. When applying the image generation system to the game system 1 illustrated in FIGS. 1 and 2, the operation section 160 may be implemented by the steering wheel 1008, the accelerator pedal 1010, the brake pedal 1009, and the like.

A storage section 170 serves as a work area for a processing section 100, a communication section 196, and the like. The function of the storage section 170 may be implemented by a RAM (DRAM or VRAM) or the like. A game program and game data necessary when executing the game program are stored in the storage section 170.

An information storage medium 180 (computer-readable medium) stores a program, data, and the like. The function of the information storage medium 180 may be implemented by an optical disk (CD or DVD), a hard disk drive (HDD), a memory (e.g., ROM), or the like. The processing section 100 performs various processes according to one embodiment of the invention based on the program (data) stored in the information storage medium 180. Specifically, a program that causes a computer (i.e., a device that includes an operation section, a processing section, a storage section, and an output section) to function as each section according to one embodiment of the invention (i.e., a program that causes a computer to perform the process of each section) is stored in the information storage medium 180.

A display section 190 displays an image generated according to one embodiment of the invention. When applying the image generation system to the game system 1 illustrated in FIGS. 1 and 2, the display section 190 may be implemented by an LCD included in a liquid crystal projector, a DMD included in a DLP projector, or the like. A sound output section 192 outputs sound generated according to one embodiment of the invention. The function of the sound output section 192 may be implemented by a speaker, a headphone, or the like.

An auxiliary storage device 194 (auxiliary memory or secondary memory) is a storage device used to supplement the capacity of the storage section 170. The auxiliary storage device 194 may be implemented by a memory card such as an SD memory card or a multimedia card, or the like.

The communication section 196 communicates with the outside (e.g., another image generation system, a server, or a host device) via a cable or wireless network. The function of the communication section 196 may be implemented by hardware such as a communication ASIC or a communication processor, or communication firmware.

The processing section 100 (processor) performs a game process, an image generation process, a sound generation process, and the like based on the operation data from the operation section 160, a program, and the like. The processing section 100 performs various processes using the storage section 170 as a work area. The function of the processing section 100 may be implemented by hardware such as a processor (e.g., CPU or GPU) or an ASIC (e.g., gate array), or a program.

The processing section 100 includes a game calculation section 102, an object space setting section 104, a moving object calculation section 106, a virtual camera control section 108, a vertex split count setting section 110, a vertex split processing section 112, a vertex position calculation section 114, a drawing section 120, and a sound generation section 130. Note that various modifications may be made, such as omitting some of these elements (sections), or adding other elements.

The game calculation section 102 performs a game calculation process. The game calculation process includes a process that starts the game when game start conditions have been satisfied, a process that proceeds with the game, a process that calculates the game results, a process that terminates the game when game end conditions have been satisfied, and the like.

The object space setting section 104 sets the object space in which a plurality of objects are disposed. For example, the object space setting section 104 disposes an object (i.e., an object formed by a primitive surface such as a polygon, a free-form surface, or a subdivision surface) that represents a display object such as a moving object (e.g., car, airplane, human, animal, robot, car, or ship), a map (topography), a building, a course (road), a tree, a wall, or a water surface in the object space. Specifically, the object space setting section 104 determines the position and the rotation angle (synonymous with orientation or direction) of the object in a world coordinate system, and disposes the object at the determined position (X, Y, Z) and the determined rotation angle (rotation angles around X, Y, and Z axes). More specifically, an object data storage section 172 included in the storage section 170 stores an object number, and object data (e.g., the position, the rotation angle, the moving speed, and the moving direction of the object (part object)) that is linked to the object number. The object space setting section 104 updates the object data every frame, for example.

The moving object calculation section 106 performs a control process that moves a moving object (e.g., car or airplane). The moving object calculation section 106 also performs a control process that causes the moving object to make a motion. Specifically, the moving object calculation section 106 performs a control process that causes the moving object (object or model object) to move or make a motion (animation) in the object space based on the operation data input by the player using the operation section 160, a program (movement/motion algorithm), data (motion data), and the like. More specifically, the moving object calculation section 106 performs a simulation process that sequentially calculates movement information (position, rotational angle, speed, or acceleration) and motion information (position or rotational angle of a part object) about the moving object every frame (e.g., 1/60th of a second). The term "frame" used herein refers to a time unit used when performing the moving object movement/motion process (simulation process) or the image generation process.

The virtual camera control section 108 controls the virtual camera (viewpoint or reference virtual camera) for generating an image viewed from a given (arbitrary) viewpoint in the object space. Specifically, the virtual camera control section 108 controls the position (X, Y, Z) or the rotation angle (rotation angles around X, Y, and Z axes) of the virtual camera (i.e., controls the viewpoint position, the line-of-sight direction, or the angle of view).

For example, when photographing the moving object from behind using the virtual camera, the virtual camera control section 108 controls the position (viewpoint position) or the direction (line-of-sight direction) of the virtual camera so that the virtual camera follows a change in the position or the direction of the moving object. In this case, the virtual camera control section 108 controls the virtual camera based on information about the position, the direction, or the speed of the moving object obtained by the moving object calculation section 106. Alternatively, the virtual camera control section 108 may rotate the virtual camera by a predetermined rotation angle, or may move the virtual camera along a predetermined path. In this case, the virtual camera control section 108 controls the virtual camera based on virtual camera data that specifies the position (moving path) or the direction of the virtual camera.

The sound generation section 130 performs a sound process based on the results of various processes performed by the processing section 100 to generate a game sound (e.g., background music (BGM), effect sound, or voice), and outputs the generated game sound to the sound output section 192.

The image generation system according to one embodiment of the invention includes the vertex split count setting section 110, the vertex split processing section 112, the vertex position calculation section 114, and the drawing section 120 in order to generate the projection image projected onto the screen 1004 illustrated in FIGS. 1 and 2.

The vertex split count setting section 110 performs a vertex split count setting process. Specifically, the vertex split count setting section 110 determines a vertex split count, and provides the vertex split processing section 112 with the determined vertex split count that is used during a vertex split process. The vertex split processing section 112 performs the vertex split process on a three-dimensional object in the object space using the vertex split count set by the vertex split count setting section 110. Specifically, the vertex split processing section 112 performs the vertex split process on each polygon (primitive) that forms the three-dimensional object.

The vertex position calculation section 114 calculates the vertex position of a drawing object (two-dimensional object) corresponding to the three-dimensional object. The drawing section 120 draws the drawing object on a drawing buffer 176 (i.e., a buffer (e.g., frame buffer or work buffer) that can store image information on a pixel basis) based on the calculated vertex position to generate the projection image projected onto the screen 1004 illustrated in FIGS. 1 and 2.

Specifically, the vertex position calculation section 114 calculates the intersection position of the projection screen and a straight line that connects the vertex position of the three-dimensional object after the vertex split process and the position of the virtual camera. The projection screen is a virtual screen for generating the projection image that is disposed in the object space (virtual three-dimensional space) corresponding to the screen 1004 illustrated in FIGS. 1 and 2. A distortion correction process (also referred to as "projection mapping process") is performed corresponding to the shape of the projection screen. The projection screen may be a screen consisting of one curved surface or a plurality of surfaces (curved surface(s) and/or planar surface(s)). The vertex position calculation section 114 calculates the vertex position of the drawing object (drawing polygon) corresponding to the three-dimensional object (three-dimensional polygon) on the drawing buffer 176 based on the calculated intersection position. Note that the term "three-dimensional object" used herein refers to an object that is disposed in the three-dimensional space (object space). For example, the three-dimensional object has three-dimensional coordinate values (X, Y, and Z coordinate values) as the vertex coordinate values. The term "drawing object"

used herein refers to an object that has two-dimensional coordinate values (X and Y coordinate values) as the vertex coordinate values.

The drawing section 120 draws the drawing object on the drawing buffer 176 based on the calculated vertex position of the drawing object to generate a projection image. The projection image thus generated is projected onto the screen 1004 from the projector 1006 illustrated in FIGS. 1 and 2. Therefore, the player can observe the image of the object space viewed from the virtual camera as a game image.

When two vertices that form a line segment included in the three-dimensional object subjected to the vertex split process are referred to as a first vertex and a second vertex, the angle formed by a first straight line that connects the first vertex and the position of the virtual camera, and a second straight line that connects the second vertex and the position of the virtual camera is referred to as $\theta$, and the vertex split count is referred to as m, the vertex split count setting section 110 sets the vertex split count m based on the angle $\theta$.

Specifically, the vertex split count setting section 110 sets the vertex split count m to a first split count m1 when the angle $\theta$ is a first angle $\theta 1$. The vertex split count setting section 110 sets the vertex split count m to a second split count m2 (m2≤m1) when the angle $\theta$ is a second angle $\theta 2$ ($\theta 2<\theta 1$). Specifically, the vertex split count setting section 110 sets the vertex split count m so that the vertex split count m decreases as the angle $\theta$ decreases (i.e., so that the vertex split count m increases as the angle $\theta$ increases). Note that the second split count m2 may be set to be equal to the first split count m1 even when the second angle $\theta 2$ is smaller than the first angle $\theta 1$ since the angle $\theta$ is a real number, and the vertex split count m is substantially a natural number. Therefore, the relationship between the first split count m1 and the second split count m2 is expressed as "m2≤m1".

In this case, the vertex split count setting section 110 may change the vertex split count m with respect to the angle $\theta$ corresponding to at least one of the projection position of the vertex of the three-dimensional object subjected to the vertex split process with respect to the screen, position information about the virtual camera, temporal change information about the position information about the virtual camera, position information about the projector, temporal change information about the position information about the projector, the shape of the screen, temporal change information about the shape of the screen, the drawing load, a temporal element, and the attribute of the three-dimensional object.

For example, the vertex split count setting section 110 causes the vertex split count m to differ between the case where the projection position of the vertex of the three-dimensional object with respect to the screen is a first position (e.g., the upper area or the center area of the screen) and the case where the projection position of the vertex of the three-dimensional object with respect to the screen is a second position (e.g., the lower area of the screen). Alternatively, the vertex split count setting section 110 causes the vertex split count m to differ corresponding to the position information about the virtual camera (viewpoint of the player), or the temporal change information about the position information about the virtual camera. For example, when the position of the virtual camera has changed, and it is considered that the game scene (game stage) or the like has changed, the vertex split count m is changed corresponding to the change in the position of the virtual camera. Alternatively, the vertex split count setting section 110 causes the vertex split count m to differ corresponding to the temporal change information (e.g., moving speed or acceleration) about the position information about the virtual camera. For example, the vertex split count setting section 110 decreases the vertex split count m when the moving speed of the virtual camera is high, and increases the vertex split count m when the moving speed of the virtual camera is low.

Alternatively, the vertex split count setting section 110 changes the vertex split count m corresponding to the position information about the projector, or changes the vertex split count m corresponding to the temporal change information (e.g., moving speed) about the position information about the projector when the position information about the projector changes dynamically. Alternatively, the vertex split count setting section 110 changes the vertex split count m corresponding to the shape of the screen, or changes the vertex split count m corresponding to the temporal change information (e.g., change speed) about the shape of the screen when the shape of the screen changes dynamically. Alternatively, the vertex split count setting section 110 causes the vertex split count m to differ corresponding to the drawing load imposed on the drawing section 120 or the like. For example, the vertex split count setting section 110 decreases the vertex split count m when the drawing load is high, and increases the vertex split count m when the drawing load is low. Alternatively, the vertex split count setting section 110 changes the vertex split count m based on the temporal element (e.g., elapsed time). For example, the vertex split count setting section 110 dynamically changes the vertex split count m corresponding to the elapsed time in the game space or the real space. Alternatively, the vertex split count setting section 110 causes the vertex split count m to differ corresponding to the attribute (e.g., type) of the three-dimensional object. For example, the vertex split count setting section 110 causes the vertex split count m to differ corresponding to each three-dimensional object. Specifically, the vertex split count setting section 110 increases the vertex split count m corresponding to the three-dimensional object (e.g., main moving object) for which a high-resolution image is required, and decreases the vertex split count m corresponding to the three-dimensional object for which high resolution is not required.

When the angle formed by a first straight line that connects the first vertex of the three-dimensional object and the position of the virtual camera, and a second straight line that connects the second vertex of the three-dimensional object and the position of the virtual camera is referred to as $\theta$, and the angle that is used as a standard for setting the vertex split count is referred to as $\epsilon$, the vertex split count setting section 110 sets the vertex split count m so that $(\theta/m)<\epsilon$ is satisfied. Specifically, the vertex split count setting section 110 controls the vertex split count m so that the value "$(\theta/m)$" does not exceed the angle $\epsilon$.

For example, when the angle under which the size of the pixel of the projection image on the screen is seen from the position of the virtual camera (i.e., player) is referred to as $\delta$, the vertex split count setting section 110 sets the vertex split count m using the angle $\epsilon$ that is set with respect to the angle $\delta$. For example, the angle $\epsilon$ is expressed using the expression "$\epsilon = k \times \delta$" (e.g., k=1), and the vertex split count m is set using the angle $\epsilon$ as a standard (reference) angle for setting the vertex split count.

In this case, the vertex split count setting section 110 may change the angle $\epsilon$ corresponding to at least one of the projection position of the vertex of the three-dimensional object subjected to the vertex split process with respect to the screen, the position information about the virtual camera, the temporal change information about the position information about the virtual camera, the position information about the projector, the temporal change information about the position information about the projector, the shape of the screen, the temporal change information about the shape of the screen, the drawing load, the temporal element, and the attribute of the three-dimensional object.

For example, the vertex split count setting section 110 causes the angle $\epsilon$ to differ between the case where the projection position of the vertex of the three-dimensional object with respect to the screen is the first position and the case where the projection position of the vertex of the three-dimensional object with respect to the screen is the second position. Alternatively, the vertex split count setting section 110 causes the angle $\epsilon$ to differ corresponding to the position information about the virtual camera, or the temporal change information about the position information about the virtual camera. For example, when the position of the virtual camera has changed, and it is considered that the game scene or the like has changed, the angle $\epsilon$ is also changed corresponding to the change in the position of the virtual camera. Alternatively, the vertex split count setting section 110 causes the angle $\epsilon$ to differ corresponding to the temporal change information about the position information about the virtual camera. For example, the vertex split count setting section 110 increases the angle $\epsilon$ (i.e., decreases the vertex split count m) when the moving speed of the virtual camera is high, and decreases the angle $\epsilon$ (i.e., increases the vertex split count m) when the moving speed of the virtual camera is low. The position of the virtual camera may change when the virtual camera has moved in the game, or when a change in the viewpoint position of the player has been detected by head tracking or the like, and reflected in the position of the virtual camera, for example. Note that the angle $\epsilon$ may be changed taking account of either case, or may be changed taking account of both cases. For example, when it is considered that the effects of a change in the viewpoint position of the player are small, or when the viewpoint position of the player cannot be detected, a change in the viewpoint position of the player may not be reflected in the position of the virtual camera. The vertex split count setting section 110 may change the angle $\epsilon$ corresponding to the position information about the projector, or change the angle $\epsilon$ corresponding to the temporal change information about the position information about the projector when the position information about the projector changes dynamically. The vertex split count setting section 110 may change the angle $\epsilon$ corresponding to the shape of the screen, or change the angle $\epsilon$ corresponding to the temporal change information about the shape of the screen when the shape of the screen changes dynamically. Alternatively, the vertex split count setting section 110 causes the angle $\epsilon$ to differ corresponding to the drawing load imposed on the drawing section 120 or the like. For example, the vertex split count setting section 110 increases the angle $\epsilon$ (i.e., decreases the vertex split count m) when the drawing load is high, and decreases the angle $\epsilon$ (i.e., increases the vertex split count m) when the drawing load is low. Alternatively, the vertex split count setting section 110 changes the angle $\epsilon$ based on the temporal element (e.g., elapsed time). For example, the vertex split count setting section 110 dynamically changes the angle $\epsilon$ corresponding to the elapsed time in the game space or the real space. Alternatively, the vertex split count setting section 110 causes the angle $\epsilon$ to differ corresponding to the attribute (e.g., type) of the three-dimensional object. For example, the vertex split count setting section 110 causes the angle $\epsilon$ to differ corresponding to each three-dimensional object. Specifically, the vertex split count setting section 110 decreases the angle $\epsilon$ (i.e., increases the vertex split count m) corresponding to the three-dimensional object for which a high-resolution image is required, and increases the angle $\epsilon$ (i.e., decreases the vertex split count m) corresponding to the three-dimensional object for which high resolution is not required.

The drawing section 120 draws a screen model object that corresponds to the shape of the screen in the viewpoint coordinate system of the virtual camera to generate a depth image in which a depth value is set on a pixel basis, or mesh information in which a depth value is set corresponding to each vertex of the screen model object. For example, the drawing section 120 draws the screen model object in the viewpoint coordinate system of the virtual camera to generate a depth image in a Z-buffer 178. The vertex position calculation section 114 transforms first and second coordinates of the vertex of the three-dimensional object using a projective transformation matrix with respect to the viewpoint coordinate system. The vertex position calculation section 114 calculates the intersection position with the screen by referring to the depth value (Z-value) of the depth image based on the first and second coordinates after transformation.

2. Method

A method according to several embodiments of the invention is described in detail below. Although an example in which the projection screen is a curved screen (domed screen) is mainly described below, the projection screen is not limited thereto. Specifically, the term "projection screen" used herein refers to a screen other than a screen consisting only of a single plane (planar surface) (i.e., planar screen). For example, the projection screen may be a screen consisting of one curved surface or a plurality of surfaces (planar surface(s) and/or curved surface(s)). Specifically, the projection screen may be a screen consisting of one curved surface, a screen consisting of a plurality of planar surfaces, a screen consisting of a plurality of curved surfaces, a screen consisting of a planar surface and a curved surface, or the like.

2.1 Per-Pixel Distortion Correction Method

When projecting an image onto a domed (curved) screen, the image may be significantly distorted when the projector is situated away from the player (viewer). However, it is possible to present an undistorted image to the player by generating the projection image projected from the projector (i.e., an image drawn on the drawing buffer of the projector) taking account of such distortion.

In this case, since linear distortion (perspective distortion) occurs when the screen consists of a single plane (planar surface), it is possible to easily correct the distortion using only one projective transformation matrix.

However, since nonlinear distortion also occurs when the screen is not a screen consisting only of a single plane (planar surface) (i.e., when the screen consists of one curved surface or a plurality of surfaces), it is impossible to correct the distortion using a simple method that uses only one projective transformation matrix, and it is necessary to perform fine correction corresponding to each area (part) of the image.

Such a distortion correction process may be implemented using a method that corrects distortion corresponding to each pixel of the drawing buffer (i.e., per-pixel distortion correction method), or a method that corrects distortion corresponding to each vertex of the three-dimensional object (i.e., per-vertex distortion correction method). The per-pixel distortion correction method is described below.

Figure 4:
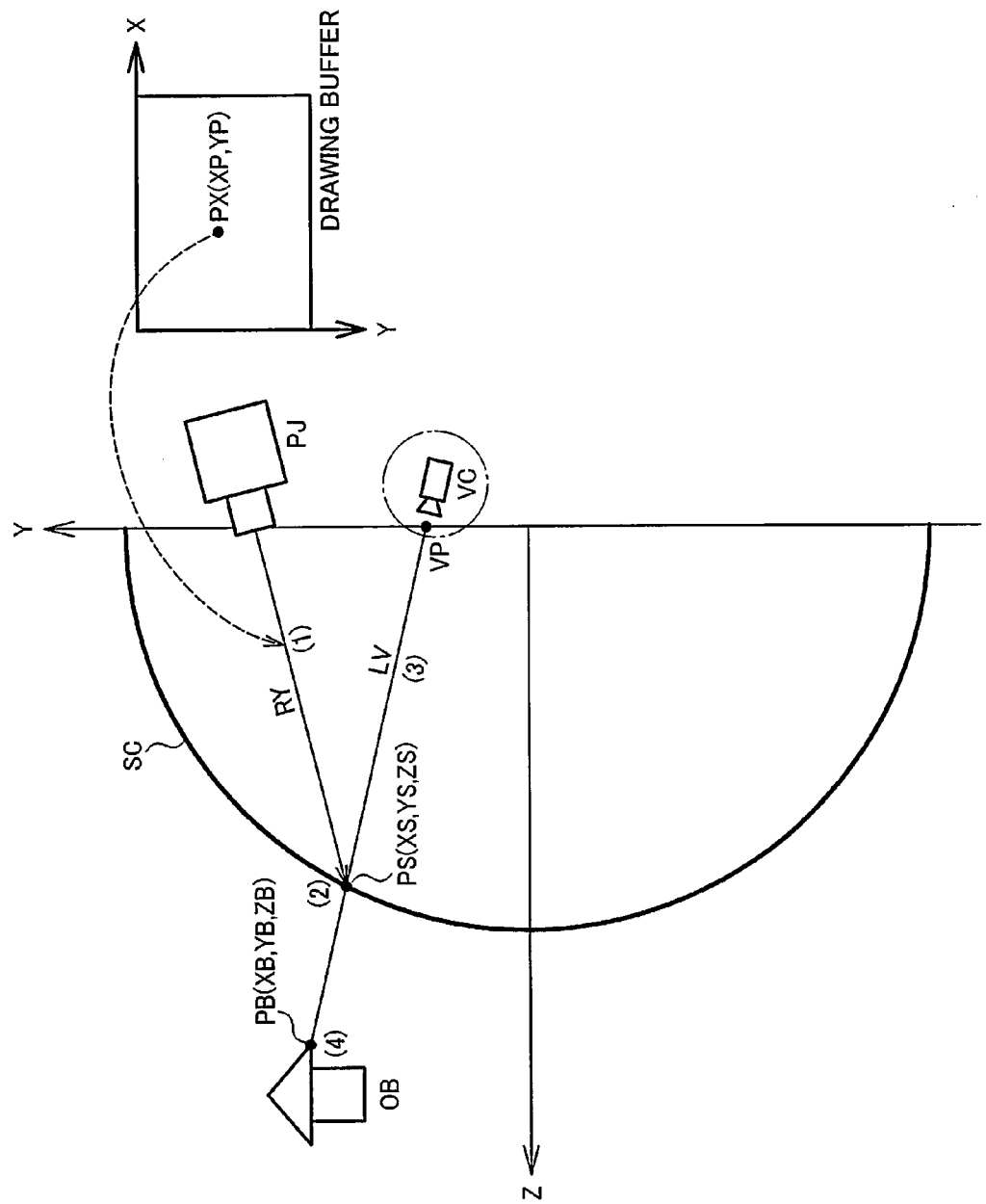
FIG. 4 is a view illustrating a method that corrects distortion corresponding to each pixel of a drawing buffer.

The per-pixel distortion correction method (i.e., a method that corrects distortion corresponding to each pixel of the drawing buffer) is implemented by sequentially performing the following steps (1), (2), (3), and (4) (see FIG. 4).

(1) A light ray RY is calculated that is projected through the lens of the projector corresponding to a pixel PX(XP, YP) on the drawing buffer (frame buffer).

(2) The position of an intersection point PS(XS, YS, ZS) of the light ray RY and a screen SC is calculated. For example, when the screen SC is represented by a numerical formula (e.g., ellipsoid formula), the intersection point PS is calculated using a numerical formula that represents the light ray (straight line) RY and a numerical formula that represents the screen SC.

(3) The color of the intersection point PS(XS, YS, ZS) must be identical with the color when the player (viewer) observes the object space (virtual space). Therefore, a straight line LV that connects the intersection point PS(XS, YS, ZS) and a position VP of a virtual camera VC that corresponds to a representative viewpoint of the player is calculated.

(4) The color of the pixel of the projection image on the drawing buffer is determined from information about the object space using the straight line LV as the line of sight. For example, the position of a point PB(XB, YB, ZB) of a three-dimensional object OB that is reached first in the object space is calculated, and the color of the pixel of the projection image on the drawing buffer is determined corresponding to the color of the point PB(XB, YB, ZB).

Alternatively, the step (4) may determine the color of the pixel of the projection image using the color of an intersection point (render texture coordinates (U, V)) with a plane (render texture) that is drawn in advance, instead of calculating the color of the intersection point PB(XB, YB, ZB) of the straight line LV and the three-dimensional object OB. The render texture may be generated by selecting a plane that is situated as close to the plane of projection as possible (hereinafter referred to as "substitute plane") in advance, and drawing an image in the substitute plane using a normal drawing method (i.e., a drawing method that uses a plane as the plane of projection).

Figure 5:
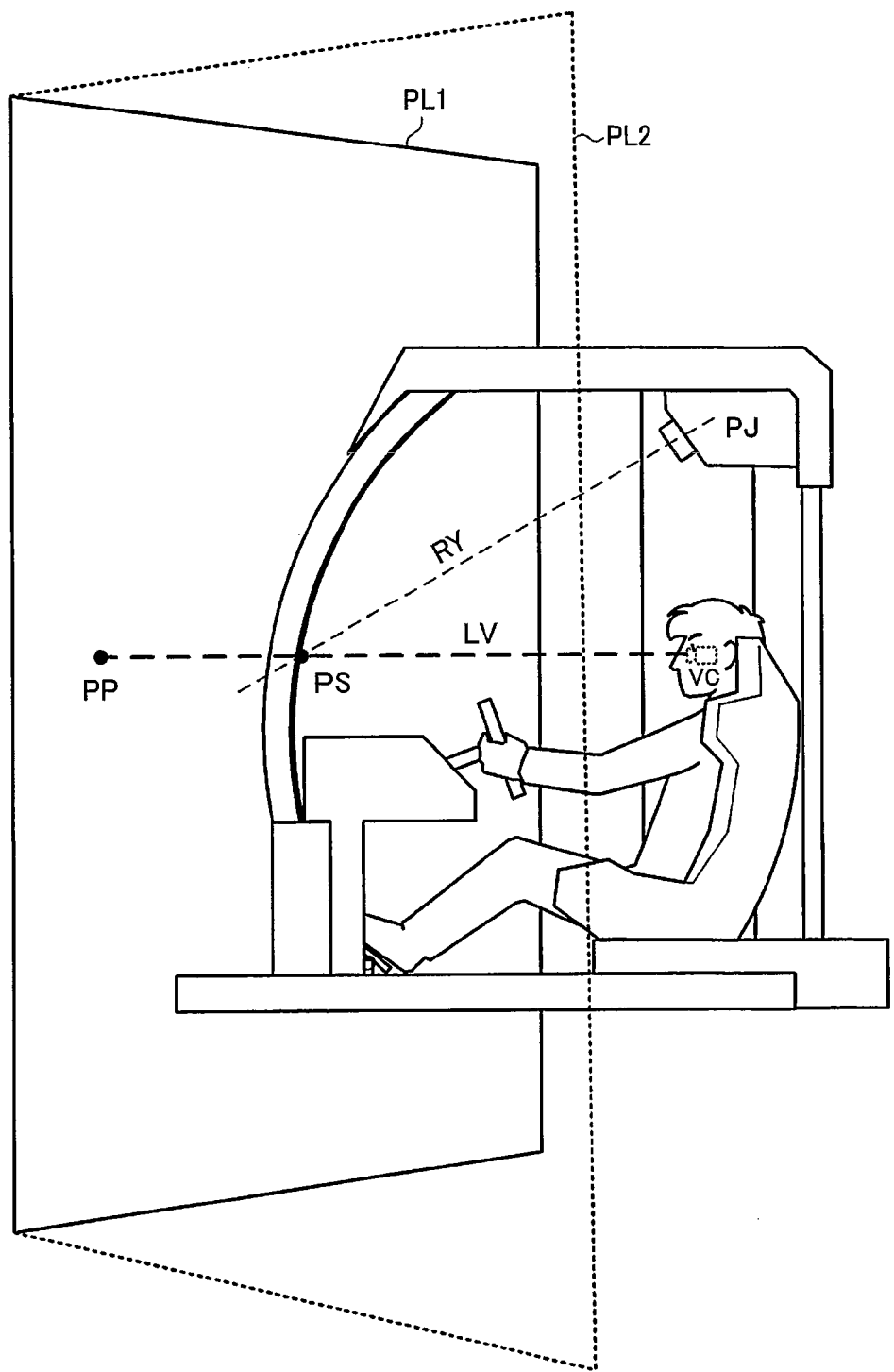
FIG. 5 is a view illustrating a method that uses a substitute plane for per-pixel distortion correction.

FIG. 5 illustrates an example of the substitute plane (see PL1 and PL2). A point PP is the intersection point of the straight line LV and the substitute plane PL1 (PL2).

Figure 6:
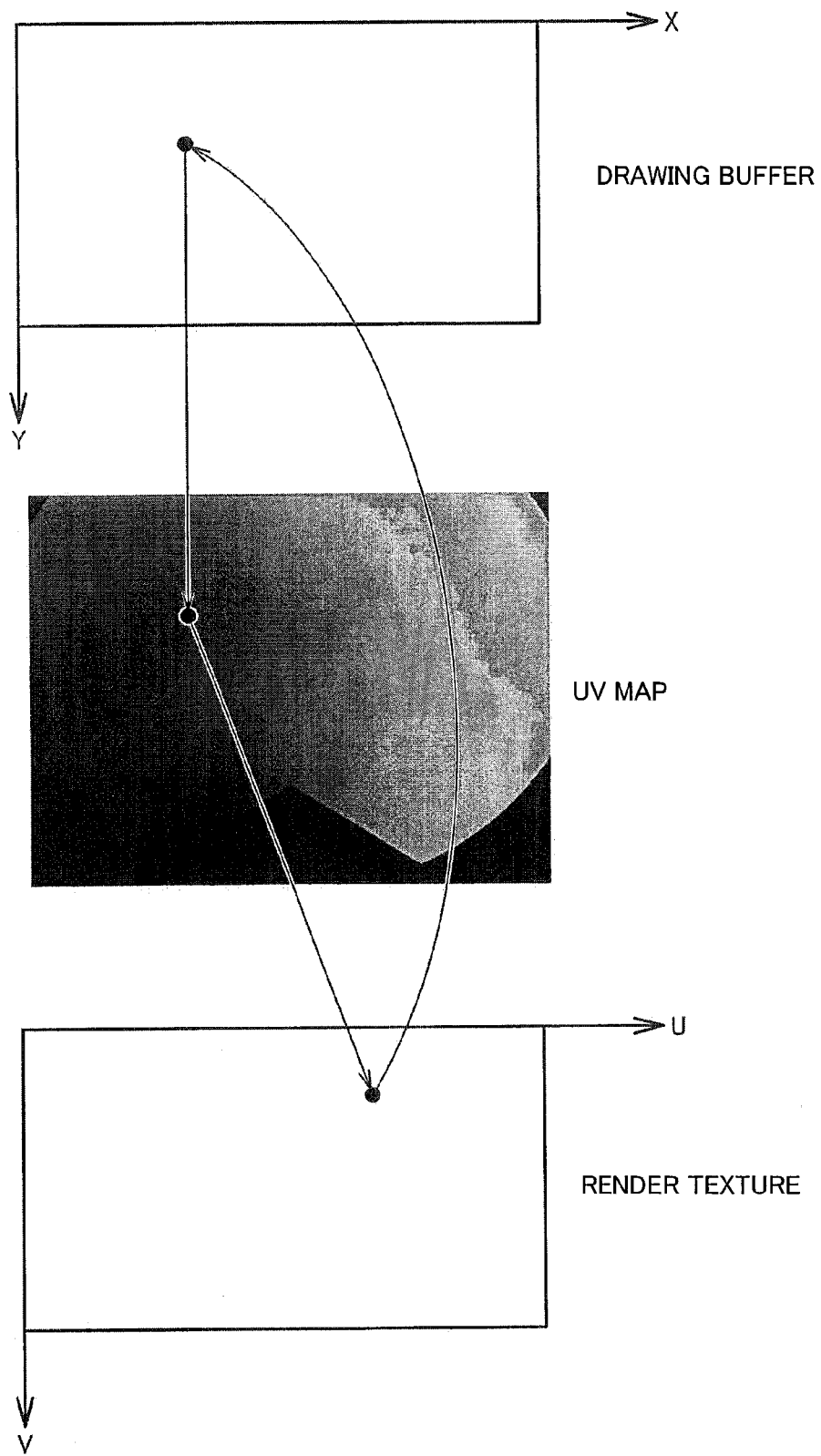
FIG. 6 is a view illustrating the relationship among a drawing buffer, a UV map, and a render texture when implementing a method that uses a substitute plane for per-pixel distortion correction.

It suffices to initially calculate the reference position of the render texture only once as long as the position of the viewpoint or the projector does not change. Examples of a typical method for storing data relating to the reference position of the render texture include a method that stores a texture that indicates the position (U, V) of the render texture for which the pixel value is referred to corresponding to each pixel of the drawing buffer. The above texture is referred to as "UV map". FIG. 6 illustrates the relationship among the drawing buffer of the projector, the UV map, and the render texture.

A large amount of resources are required to calculate and store the corresponding point (UV coordinates) of the render texture illustrated in FIG. 6 corresponding to each pixel of the drawing buffer. When it is difficult to provide such a large amount of resources, the corresponding point (XP, YP) on the drawing buffer and the corresponding point (U, V) on the render texture are calculated corresponding to a representative vertex that is appropriately disposed on the screen SC, and a triangular polygon mesh that connects the corresponding points is generated. The coordinates (U, V) recorded as information corresponding to each vertex of the triangular polygon when drawing the triangular polygon are referred to, and the coordinates (U, V) interpolated from the above coordinates are used for a point within the triangular polygon. The above configuration makes it possible to significantly save resources.

Figure 7:
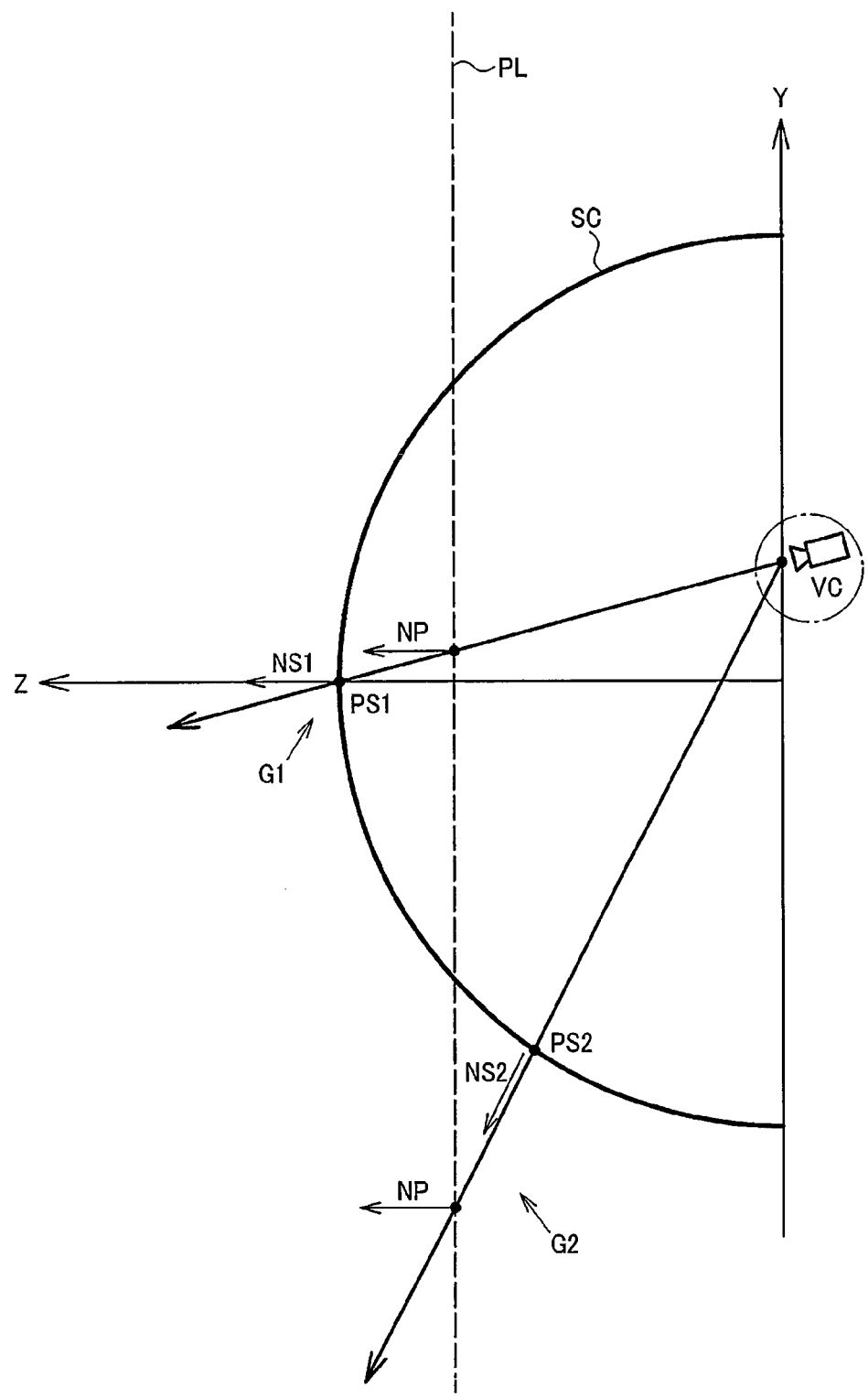
FIG. 7 is a view illustrating a problem that occurs when using a method that uses a substitute plane.

The per-pixel distortion correction method has a common problem in which the image quality (resolution) decreases locally. As illustrated in FIG. 7, a high image quality is obtained in an area in which a normal NS1 to the surface of the screen SC is identical or close to a normal NP to the substitute plane PL (see G1). However, the image quality significantly deteriorates in an area in which a normal NS2 to the surface of the screen SC differs to a large extent from the normal NP to the substitute plane PL (see G2 in FIG. 7).

Figure 8:
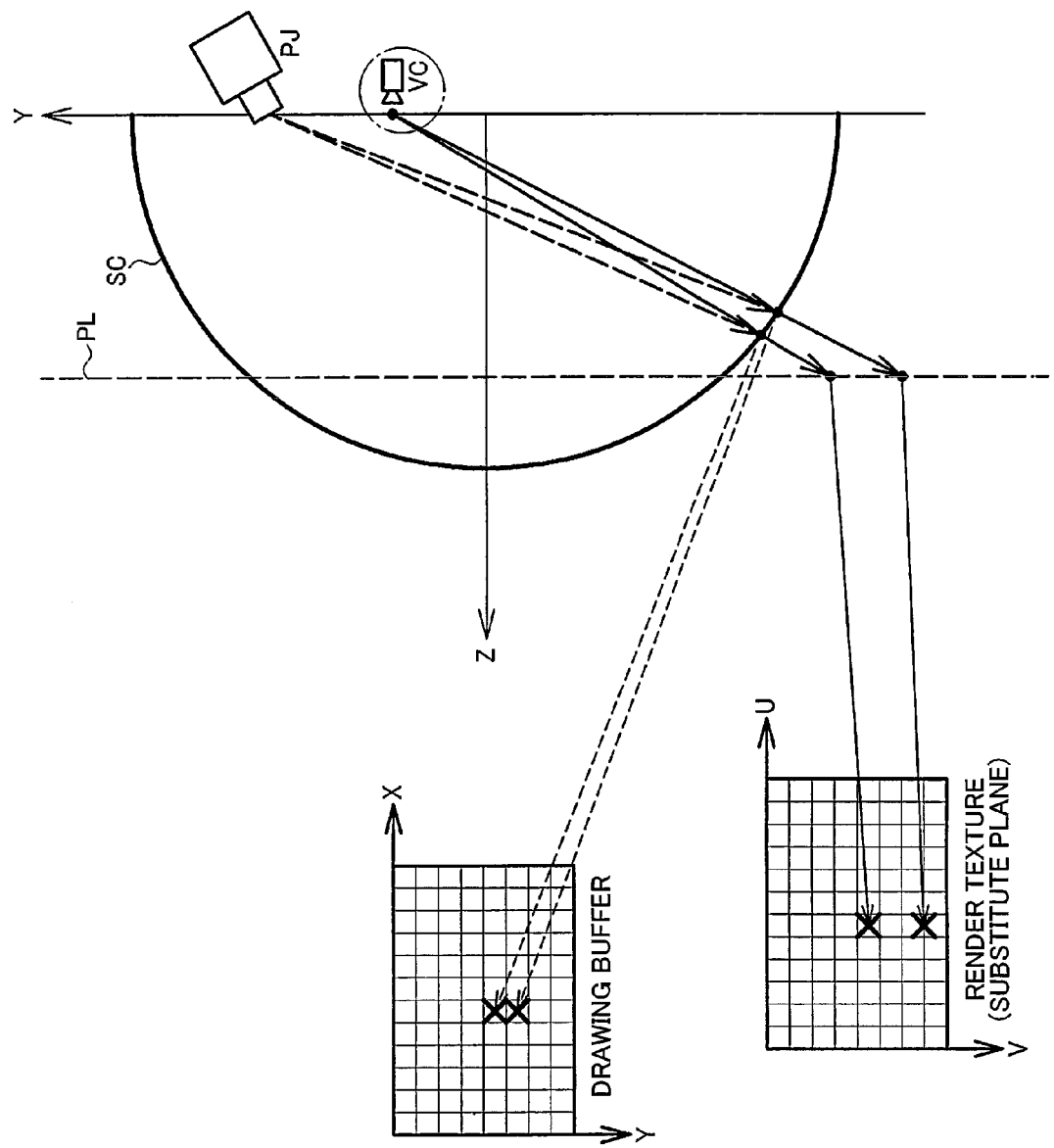
FIG. 8 is a view illustrating a problem that occurs when using a method that uses a substitute plane.

As illustrated in FIG. 8, when the normal NS2 to the surface of the screen SC differs to a large extent from the normal NP to the substitute plane PL, pixels adjacent to each other on the drawing buffer of the projector PJ are situated away from each other on the render texture generated by drawing the substitute plane PL. Since a pixel interpolation process (e.g., bilinear interpolation process) does not effectively function when the pixels are situated significantly away from each other on the render texture, an image with conspicuous jaggies is obtained.

The above problem may be solved by increasing the number of substitute planes, for example. According to the above method, however, since it is necessary to increase the number of drawing operations corresponding to an increase in the number of substitute planes, the drawing load increases to a large extent.

2.2 Per-Vertex Distortion Correction Method

Figure 9:
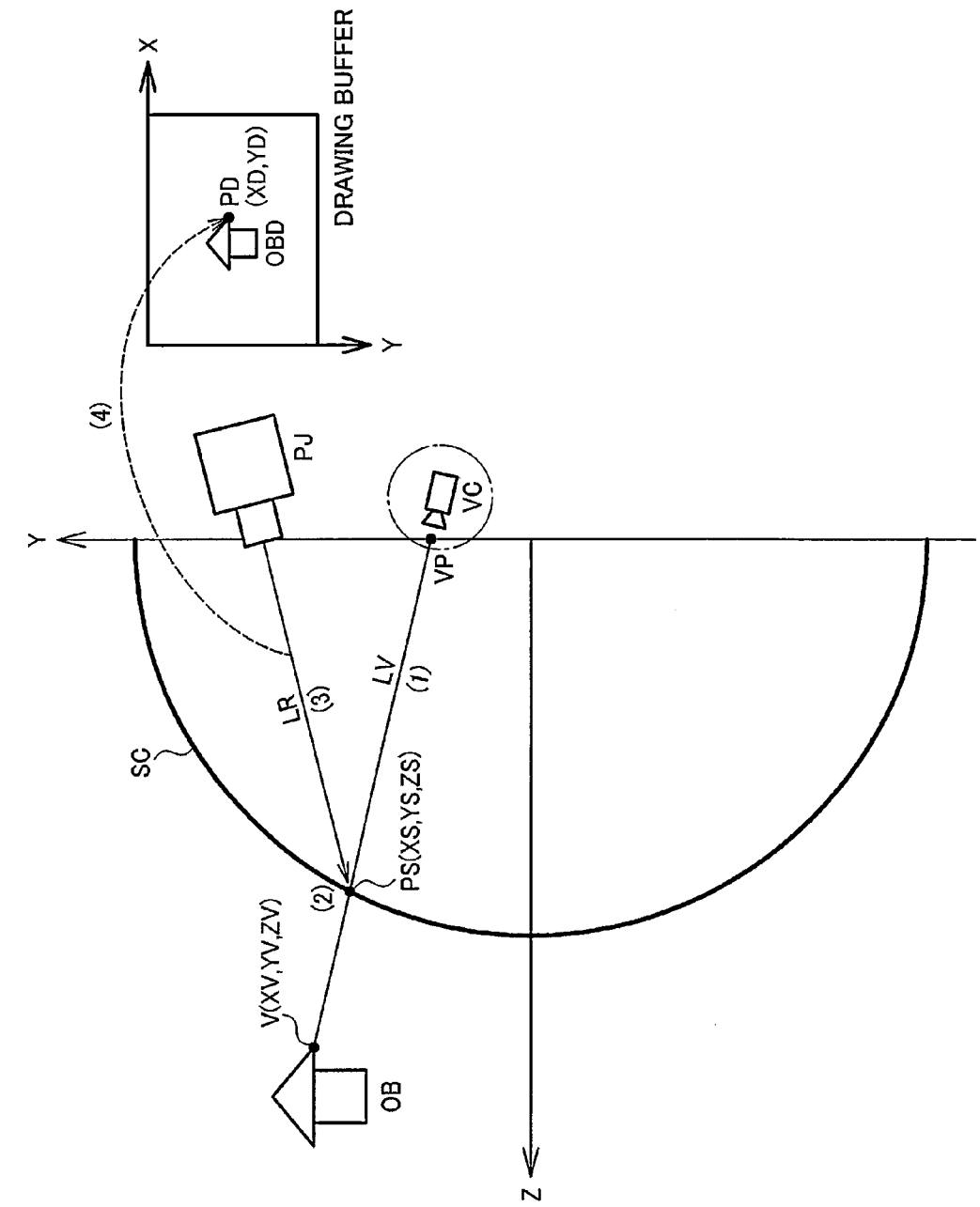
FIG. 9 is a view illustrating a method that corrects distortion corresponding to each vertex of an object.

The per-vertex distortion correction method (i.e., a method that corrects distortion corresponding to each vertex of a drawing object) is described below. The per-vertex distortion correction method transforms the vertex of the three-dimensional object in the object space into a point on the drawing buffer of the projector. The per-vertex distortion correction method is implemented by sequentially performing the following steps (1), (2), (3), and (4) (see FIG. 9). Specifically, the per-vertex distortion correction method is implemented by performing the steps illustrated in FIG. 4 in reverse order.

(1) A straight line LV is calculated that connects the position of a vertex V(XV, YV, ZV) of a three-dimensional object OB in the object space and a position VP of a virtual camera VC that corresponds to a representative viewpoint of the player.

(2) The position of an intersection point PS(XS, YS, ZS) of the calculated straight line LV and a screen SC is calculated. For example, when the screen SC is represented by a numerical formula (e.g., ellipsoid formula), the intersection point PS is calculated using a numerical formula that represents the straight line LV and a numerical formula that represents the screen SC.

(3) A straight line LR that connects the position of the intersection point PS(XS, YS, ZS) and the position of a projector JP is calculated.

(4) The position of a point PD(XD, YD) on the drawing buffer that corresponds to the straight line LR is calculated. The point PD corresponds to the vertex of a drawing object OBD on the drawing buffer that corresponds to the three-dimensional object OB. Note that the point PD is calculated from the straight line LR using information about the optical system (e.g., the characteristics or the arrangement of the lens of the projector PJ).

A rasterization process that connects the vertices of the drawing object OBD, and colors the drawing object OBD is then performed to generate a projection image on the drawing buffer.

Figure 10:
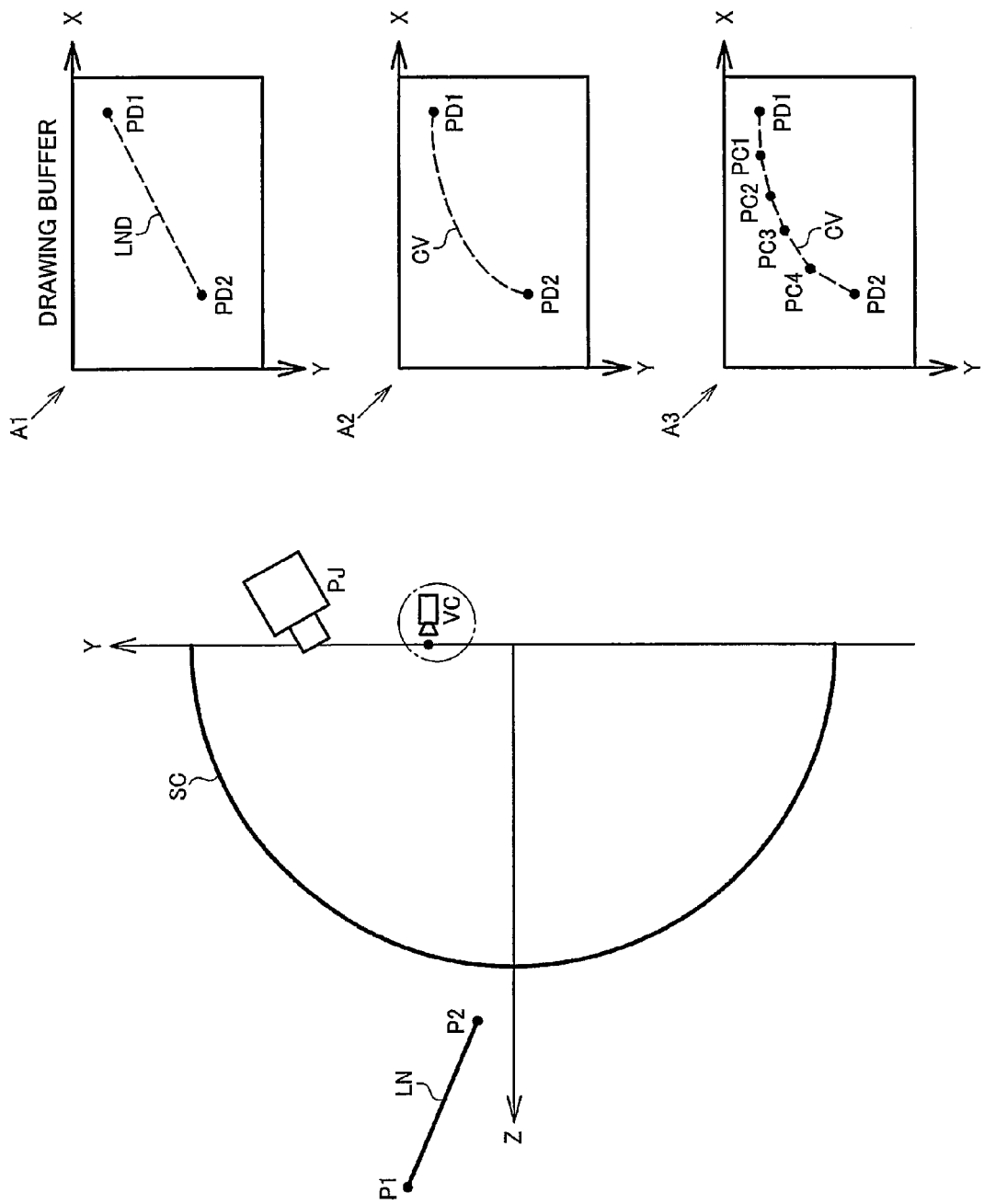
FIG. 10 is a view illustrating a problem that occurs when using a method that corrects distortion corresponding to each vertex of an object.

The per-vertex distortion correction method transforms each vertex of the three-dimensional object OB into a point on the drawing buffer through coordinate transformation. For example, points P1 and P2 in the object space that are connected by a straight line LN (line segment) (see FIG. 10) are respectively transformed into points on the drawing buffer through coordinate transformation. The drawing process is performed on the assumption that the points P1 and P2 are connected by a straight line on the drawing buffer. As illustrated in FIG. 10 (see A1), a point PD1 on the drawing buffer is obtained by subjecting the point P1 in the object space to coordinate transformation, and a point PD2 on the drawing buffer is obtained by subjecting the point P2 in the object space to coordinate transformation. Therefore, the straight line LN in the object space is drawn as a straight line LND that connects the points PD 1 and PD2 on the drawing buffer.

However, when the projection screen SC is not a plane, the straight line LN in the object space is drawn as a curve CV on the drawing buffer (see A2 in FIG. 10). Therefore, when a linear interpolation process (see A1) is used as the interpolation process on the drawing buffer, a distorted image is observed by the player. In order to ensure that the straight line LN in the object space is observed as a straight line when viewed from the player, it is necessary to draw the straight line LN as the curve CV on the drawing buffer (see A2 in FIG. 10). For example, the straight line LN in the object space is observed as a straight line when viewed from the player when the straight line LN in the object space is divided at a plurality of points, and the plurality of points are subjected to coordinate transformation, and connected on the drawing buffer (see A3 in FIG. 10). In order to ensure that the texture inside the polygon can be observed without distortion, it is also necessary to sufficiently finely divide the inside of the polygon.

However, it takes time to finely divide a large polygon that forms a three-dimensional object (model object) in advance. Moreover, the amount of data increases. It is useless to finely divide the polygon when a small three-dimensional object is observed at a distant position. In such a case, unnecessary load is imposed during the drawing process.

2.3 History of GPU Shader Program

A model of a GPU shader program was designed to use a vertex shader and a pixel shader. The vertex shader transforms the coordinates (X, Y, Z) of the drawing target object in the object space into coordinates (X, Y) in the drawing plane. A rasterization process is then performed based on the coordinate values, and the pixel shader determines the final color of each processing target pixel referring to the color at the texture coordinates (U, V) corresponding to the coordinates (X, Y), and the like. For example, the per-pixel distortion correction method utilizes the pixel shader, and the per-vertex distortion correction method utilizes the vertex shader.

Figure 11:
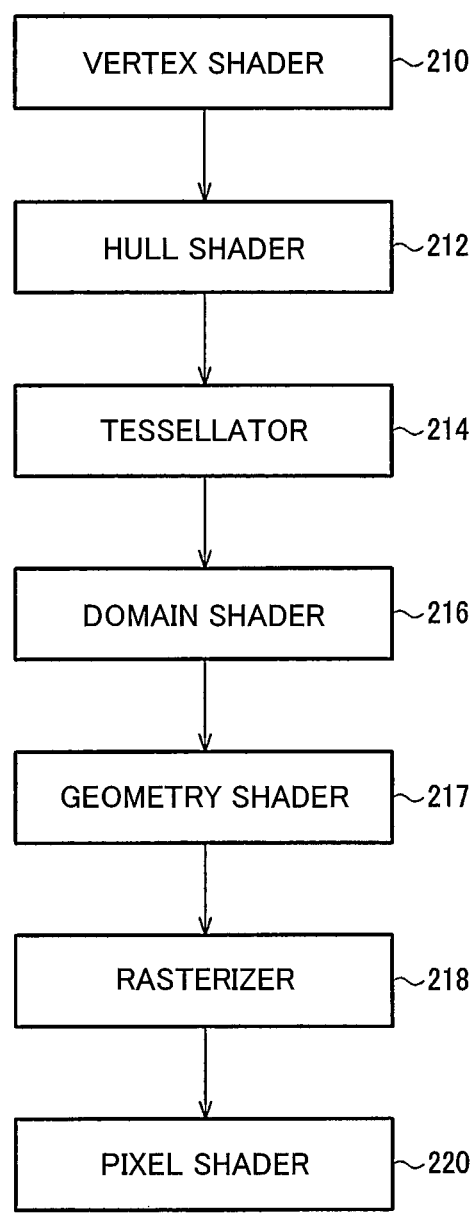

As illustrated in FIG. 11, the current GPU (conforming to DirectX11) is designed so that a hull shader 212, a tessellator 214, a domain shader 216, a geometry shader 217, and the like are added between a vertex shader 210 and a rasterizer 218 that receives the coordinates (X, Y). These additional functions make it possible to optionally increase the number of vertices during the drawing process, or finely divide a polygon mesh.

2.4 Application of Vertex Split Process to Per-Vertex Correction Process

In one embodiment of the invention, the problem described above with reference to FIG. 10 is solved by applying the vertex split process (tessellation) and the like newly added to the GPU to the per-vertex distortion correction method.

Specifically, the vertex split count setting section 110 illustrated in FIG. 3 performs the vertex split count setting process. The vertex split count setting section 110 may be implemented by the hull shader 212 illustrated in FIG. 11, for example. The hull shader 212 is a programmable shader, and may be implemented by programming various processes using a shading language.

The vertex split processing section 112 performs the vertex split process (tessellation) on the three-dimensional object (three-dimensional polygon) in the object space using the vertex split count set by the vertex split count setting section 110. The vertex split processing section 112 may be implemented by the tessellator 214 illustrated in FIG. 11, for example. Note that the polygon edge split count and the polygon internal split count are set to the tessellator 214. The polygon internal split count may be increased when the texture mapped onto the polygon is distorted for the reason described above with reference to FIG. 10.

The vertex position calculation section 114 calculates the intersection position of the projection screen and a straight line that connects the vertex position of the three-dimensional object after the vertex split process and the position of the virtual camera. Specifically, the vertex position calculation section 114 performs the steps (1) and (2) illustrated in FIG. 9. The vertex position calculation section 114 then calculates the vertex position (PD) of the drawing object (OBD) corresponding to the three-dimensional object (OB) on the drawing buffer based on the intersection position (PS in FIG. 9). Specifically, the vertex position calculation section 114 performs the steps (3) and (4) illustrated in FIG. 9. The vertex position calculation section 114 may be implemented by the domain shader 216 illustrated in FIG. 11, for example. The domain shader 216 is a programmable shader, and may be implemented by programming various processes using a shading language. Note that the process that calculates the straight line that connects the vertex position of three-dimensional object and the position of the virtual camera, and calculates the intersection position of the straight line and the projection screen, and the like are performed using the camera coordinate system (viewpoint coordinate system) of the virtual camera, for example.

The drawing section 120 then draws the drawing object on the drawing buffer 176 based on the vertex position of the drawing object to generate a projection image. Specifically, the drawing section 120 performs the rasterization process that connects the vertices of the drawing object projected onto the drawing buffer 176, and colors the drawing object to generate a projection image. The drawing section 120 may be implemented by the rasterizer 218 and the pixel shader 220 illustrated in FIG. 11, for example.

According to one embodiment of the invention, the problem described above with reference to FIG. 10 that occurs when using the per-vertex distortion correction method is thus solved by effectively utilizing the functions newly added to the GPU. Therefore, a projection image for which distortion has been corrected, and a deterioration in image quality has been suppressed, can be generated by dynamically performing the vertex split process during the drawing process using tessellation, even if the three-dimensional object is not provided as data that is divided in advance using a number of small polygons. Specifically, it is possible to generate a high-quality projection image with a small amount of distortion while suppressing an increase in the amount of data and an increase in processing load.

Note that the geometry shader 217 is not indispensable for the above process. However, the geometry shader 217 may be used in combination with the above process when performing another process, for example.

2.5 Vertex Split Count Setting

The details of the vertex split count setting method according to one embodiment of the invention are described below. When applying the vertex split process to the per-vertex distortion correction method as described above, it may be difficult to provide a clear standard for determining a sufficient vertex split count.

In one embodiment of the invention, the standard for determining the vertex split count is determined using the following method in order to deal with the above problem.

Figure 12:
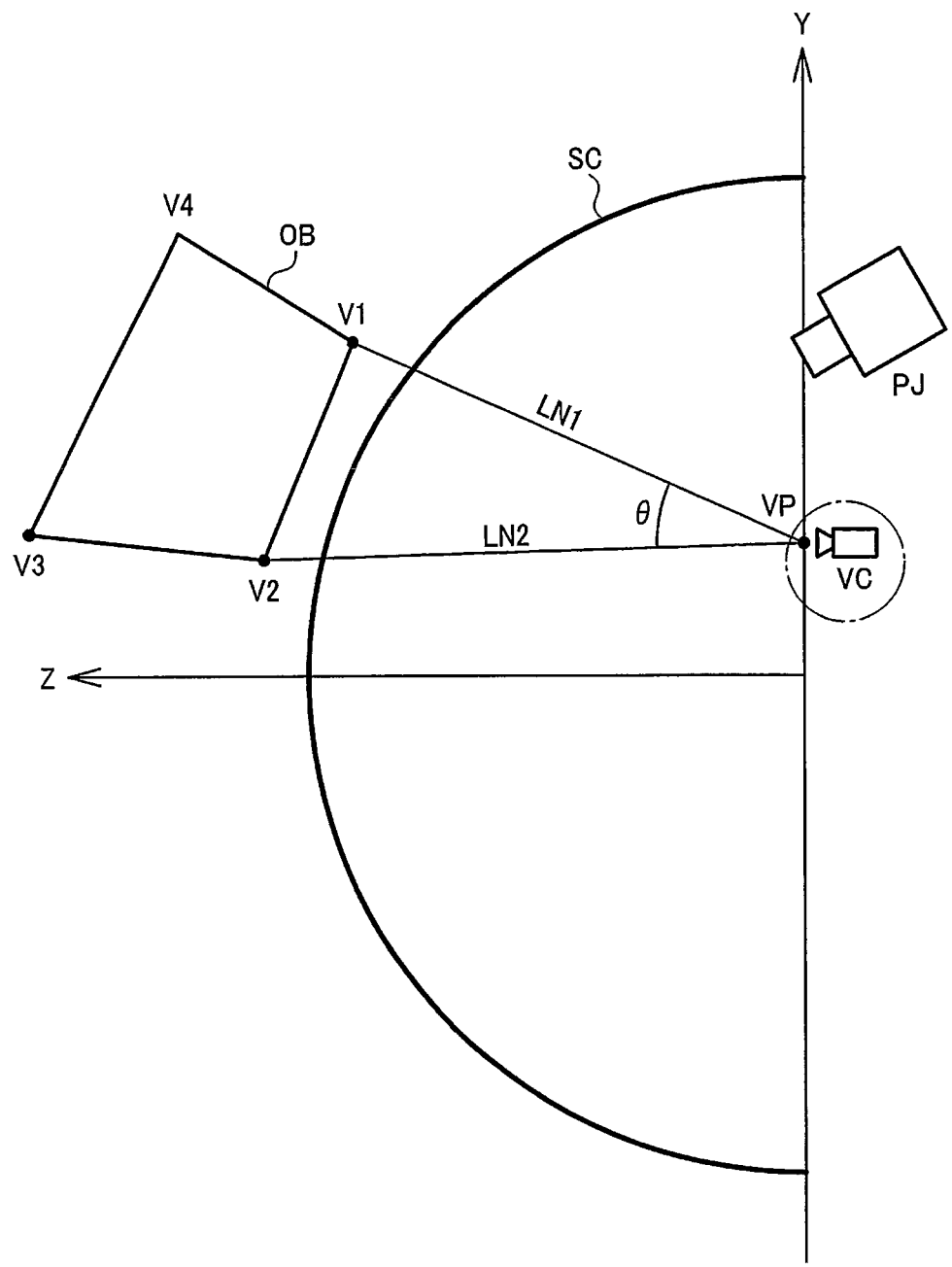
FIG. 12 is a view illustrating a method according to one embodiment of the invention.

As illustrated in FIG. 12, two vertices that form a line segment included in a three-dimensional object OB subjected to the vertex split process are referred to as a first vertex V1 and a second vertex V2, for example. Note that the following description is given taking an example in which the three-dimensional object OB is formed by one quadrilateral polygon for convenience of explanation. The angle formed by a first straight line LN1 that connects the first vertex V1 and the position VP of the virtual camera VC, and a second straight line LN2 that connects the second vertex V2 and the position VP of the virtual camera VC is referred to as $\theta$, and the vertex split count is referred to as m.

In this case, the vertex split count m is set corresponding to the angle $\theta$. For example, the vertex split count m is increased when the angle $\theta$ is large, and decreased when the angle $\theta$ is small.

Figure 13A:
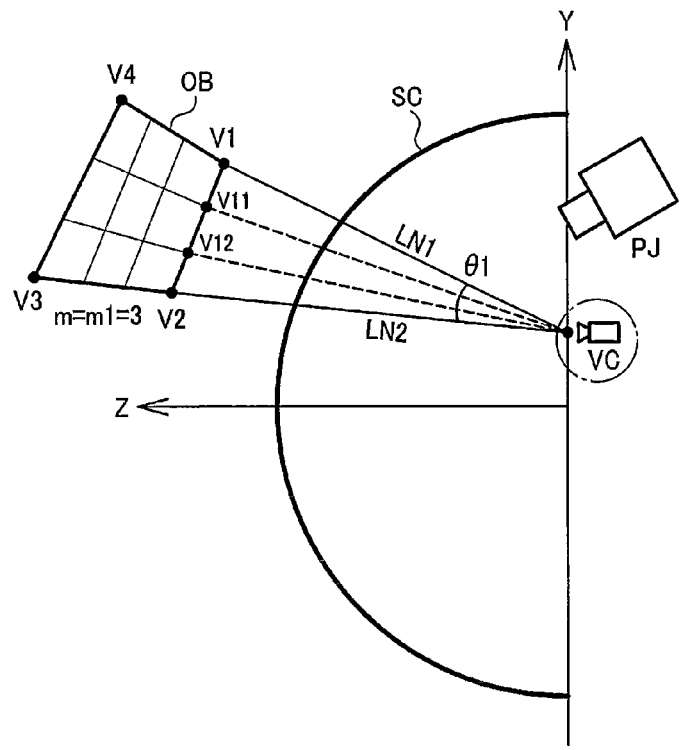
FIGS. 13A and 13B are views illustrating a vertex split count setting method.
Figure 13B:
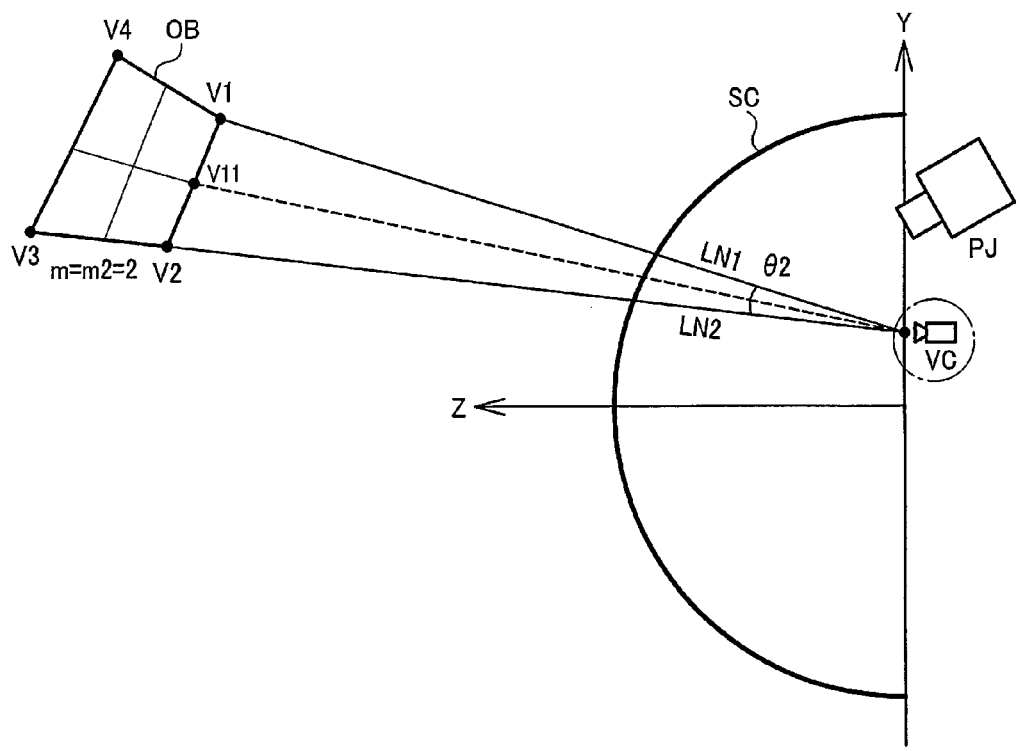

For example, the angle $\theta$ is a first angle $\theta 1$ in FIG. 13A, and is a second angle $\theta 2$ in FIG. 13B. The first angle $\theta 1$ and the second angle $\theta 2$ satisfy the relationship "$\theta 2 < \theta 1$".

In one embodiment of the invention, the vertex split count m is set to a first split count m1 when the angle $\theta$ is the first angle $\theta 1$, and set to a second split count m2 that is equal to or smaller than the first split count m1 when the angle $\theta$ is the second angle $\theta 2$. For example, m=m1=3 in FIG. 13A, and m=m2=2 in FIG. 13B (i.e., the relationship "m2≤m1" is satisfied). In FIG. 13A, the line segment that connects the first vertex V1 and the second vertex V2 of the three-dimensional object OB is split into three, and new vertices V11 and V12 are generated. In FIG. 13B, the line segment that connects the first vertex V1 and the second vertex V2 of the three-dimensional object OB is split into two, and a new vertex V11 is generated. Note that m2=m1 may be satisfied even if $\theta 2 < \theta 1$ since the angle $\theta$ is a real number, while the vertex split count m is substantially a natural number. Therefore, the relational expression "m2≤m1" is used.

According to the above configuration, the vertex split count m (polygon split count) increases for the three-dimensional object OB that is disposed at a position close to the virtual camera VC (see FIG. 13A), and decreases for the three-dimensional object OB that is disposed at a position away from the virtual camera VC (see FIG. 13B). Therefore, the level of detail (LOD) effect can also be achieved, and the drawing efficiency can be improved.

Figure 14:
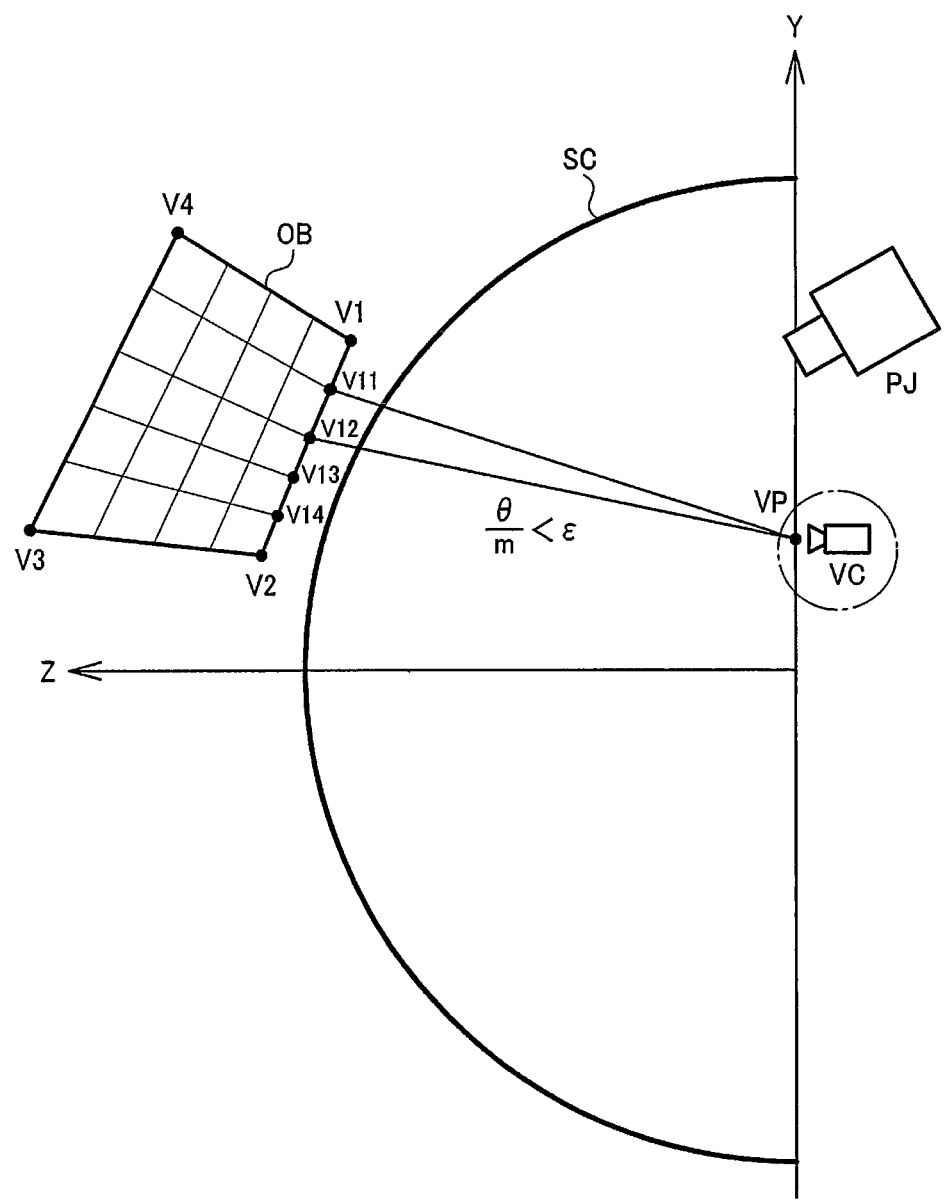
FIG. 14 is a view illustrating a vertex split count setting method.

In FIG. 14, the vertex split count m is determined using the angle $\epsilon$ (visual angle) that is used as the standard for setting the vertex split count. Specifically, the vertex split count m is set (determined) so that the relational expression "$(\theta/m) < \epsilon$" is satisfied (see FIG. 14). In FIG. 13A, since the angle $\theta$ is the first angle $\theta 1$ (large angle), the vertex split count m is set to be a large value (m=m1=3) so that the relational expression "$(\theta/m) < \epsilon$" is satisfied, for example. In FIG. 13B, since the angle $\theta$ is the second angle $\theta 2$ (small angle), the vertex split count m is set to be a small value (m=m2=2) so that the relational expression "$(\theta/m) < \epsilon$" is satisfied.

It is possible to implement the vertex split count setting process using a simple process, and achieve the LOD effect and the like by setting the vertex split count m with respect to the angle $\epsilon$.

Figure 15:
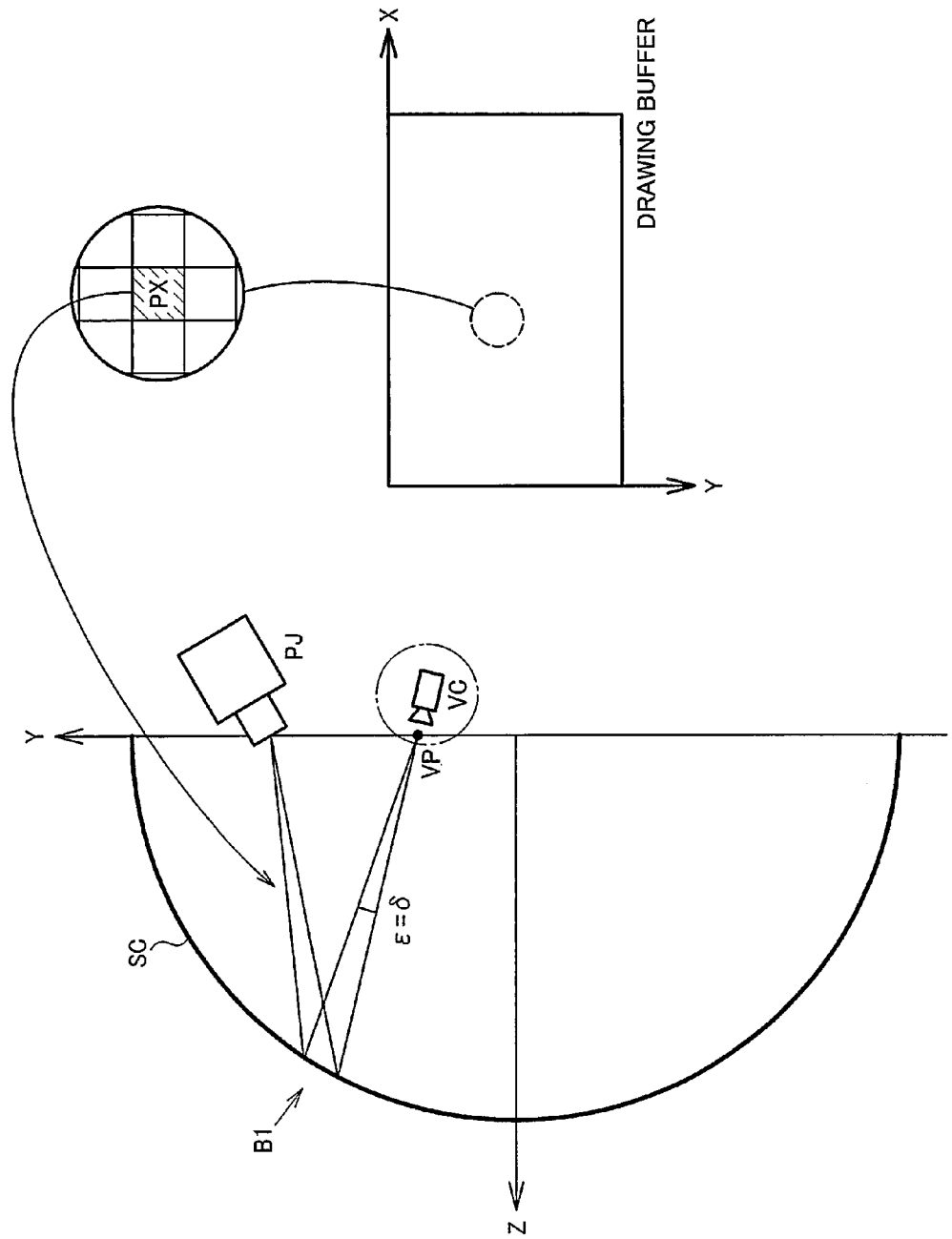
FIG. 15 is a view illustrating a method for setting an angle $\epsilon$ that is used as a standard for setting a vertex split count.

It is desirable to set the angle $\epsilon$ based on the angle $\delta$ under which the size of the pixel PX of the projection image on the screen SC is seen from the position of the virtual camera VC. For example, $\epsilon = \delta$ in FIG. 15. The vertex split count m is set using the angle $\epsilon$ that is set with respect to the angle $\delta$.

For example, the angle $\epsilon$ is set using the relational expression "$\epsilon = k \times \delta$" (e.g., k≤1). For example, the angle $\epsilon$ is set to be equal to the angle $\delta$ (k=1) (see FIG. 15). Alternatively, the angle $\epsilon$ may be set to be equal to $\delta/2$ (k=½). The angle $\epsilon$ is set based on the angle $\delta$ for the following reason. Specifically, when the vertex split process is performed so that the angle under which the size of the pixel is seen from the virtual camera VC corresponds to less than 1 pixel, distortion correction and an improvement in image quality may not be implemented although the processing load increases. It is desirable to set the coefficient k to be equal to or smaller than 1 when priority is given to image quality. Note that the coefficient k may be set to be larger than 1 when it is desired to give priority to the processing speed, for example.

Figure 16:
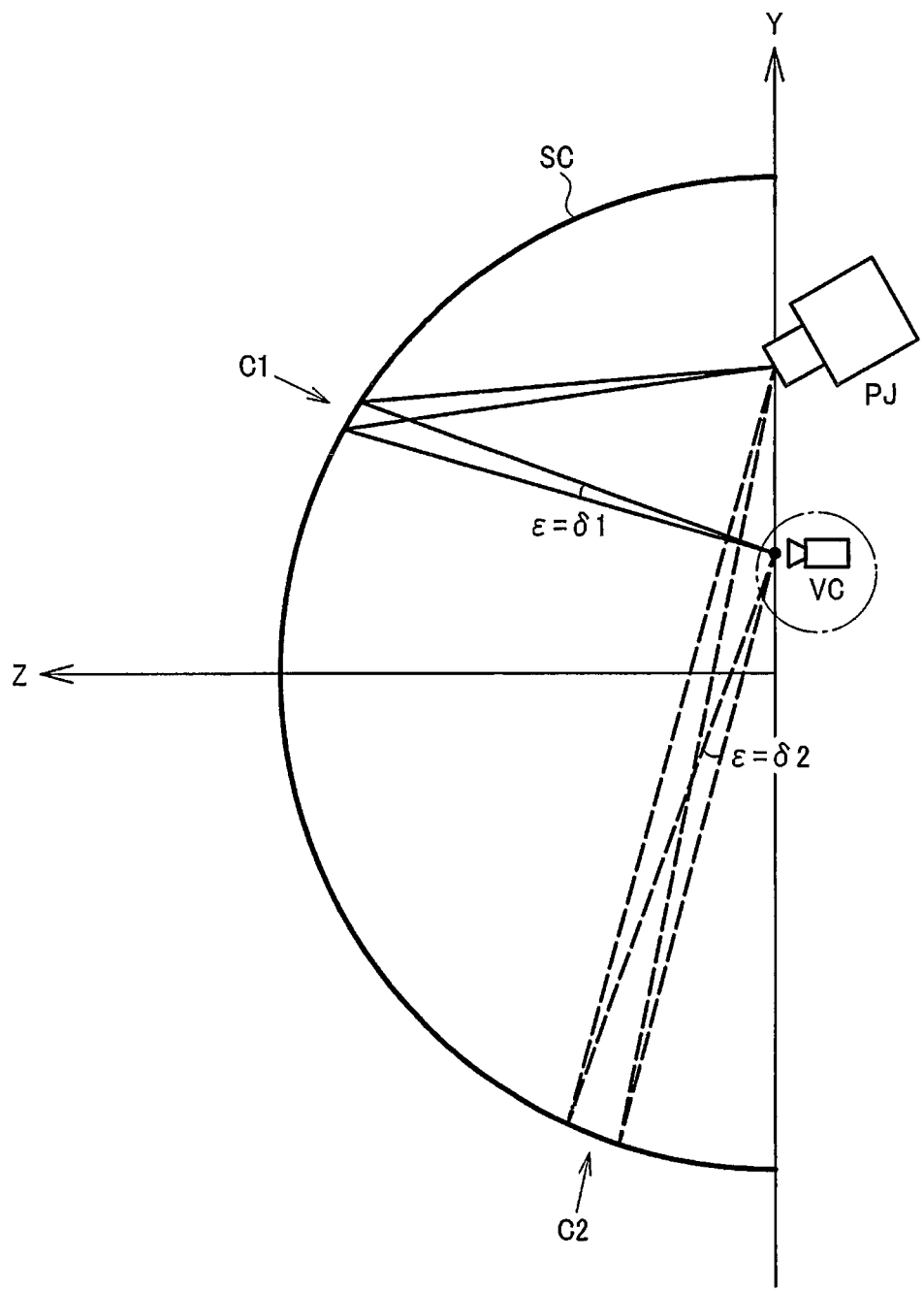
FIG. 16 is a view illustrating a method for setting an angle $\epsilon$ that is used as a standard for setting a vertex split count.

As illustrated in FIG. 16 (see C1 and C2), the size of the pixel of the projection image on the screen SC differs depending on the projection position with respect to the screen SC. For example, when the distance from the projector PJ to the screen SC is long (see C2 in FIG. 16), the size of the pixel of the projection image on the screen SC is larger than that when the distance from the projector PJ to the screen SC is short (see C1 in FIG. 16). Therefore, the angle $\delta$ under which the size of the pixel of the projection image is seen from the virtual camera VC also differs between the case where the distance from the projector PJ to the screen SC is short (see C1) and the case where the distance from the projector PJ to the screen SC is long (see C2) since the projector PJ and the virtual camera VC are situated at different positions. Specifically, $\delta = \delta 1$ when the distance from the projector PJ to the screen SC is short (see C1), and $\delta = \delta 2$ when the distance from the projector PJ to the screen SC is long (see C2), provided that the relational expression "$\delta 1 < \delta 2$" is satisfied.

Since the size of the pixel of the projection image differs depending on the projection position with respect to the screen, it is desirable to change the angle $\epsilon$ corresponding to the projection position. Specifically, the angle $\epsilon$ (vertex split count) is changed corresponding to the projection position of the vertex of the three-dimensional object subjected to the vertex split process with respect to the screen. For example, the angle $\epsilon$ is decreased at the projection position indicated by C1, and increased at the projection position indicated by C2.

When the angle $\epsilon$ is set to be variable, it is possible to perform the drawing process that sufficiently utilizes the performance (resolution) of the projector PJ even when a change in resolution has occurred due to replacement of the projector PJ, for example.

The angle $\epsilon$ (vertex split count) may be changed based on the position information about the virtual camera VC, the temporal change information about the position information about the virtual camera VC, or the drawing load, for example. For example, when the position of the virtual camera VC has changed, and it is considered that the game scene (game stage) has changed, the angle $\epsilon$ is set to be appropriate for the game scene. The angle $\epsilon$ may be changed corresponding to the moving speed (temporal change information about the position information) of the virtual camera VC, or the drawing load. For example, when the angle $\epsilon$ is calculated by $\epsilon=k\times\delta$, the angle $\epsilon$ is increased by increasing the coefficient k when the moving speed of the virtual camera VC (leading character camera (the viewpoint position of the player may be detected by head tracking or the like, and reflected in the position of the virtual camera VC)) is high, or the drawing load is high. When the vertex split count m is set using the relational expression "$(\theta/m)<\epsilon$", the vertex split count m decreases with respect to an identical angle $\theta$ as the angle $\epsilon$ increases. Therefore, it is possible to maintain a high frame rate in a scene in which high image quality is not required. The angles may be decreased by decreasing the coefficient k when in a scene in which high image quality is required rather than a high frame rate (e.g., a scene in which the movement of the camera is relatively slow).

The angle $\epsilon$ (vertex split count) may be changed corresponding to the position information about the projector, the temporal change information about the position information about the projector, the shape of the screen, or the temporal change information about the shape of the screen. For example, the angle $\epsilon$ can be set to be optimum for the installation position of the projector by changing the angle $\epsilon$ corresponding to the position information about the projector. It is possible to flexibly deal with projection mapping onto a structure (e.g., building) by setting the angle $\epsilon$ corresponding to the position information about the projector, the temporal change information about the position information about the projector, the shape of the screen, or the temporal change information about the shape of the screen. For example, it is possible to deal with a situation in which the shape of the structure that is subjected to projection mapping changes dynamically.

The angle $\epsilon$ (vertex split count) may be changed corresponding to the temporal element or the attribute of the three-dimensional object. In this case, it is possible to change the angle $\epsilon$ corresponding to the elapsed time in the game space, the attribute (type) of the three-dimensional object that appears in the game, or the like, and provide a method suitable for generating a game projection image, for example.

Figure 17:
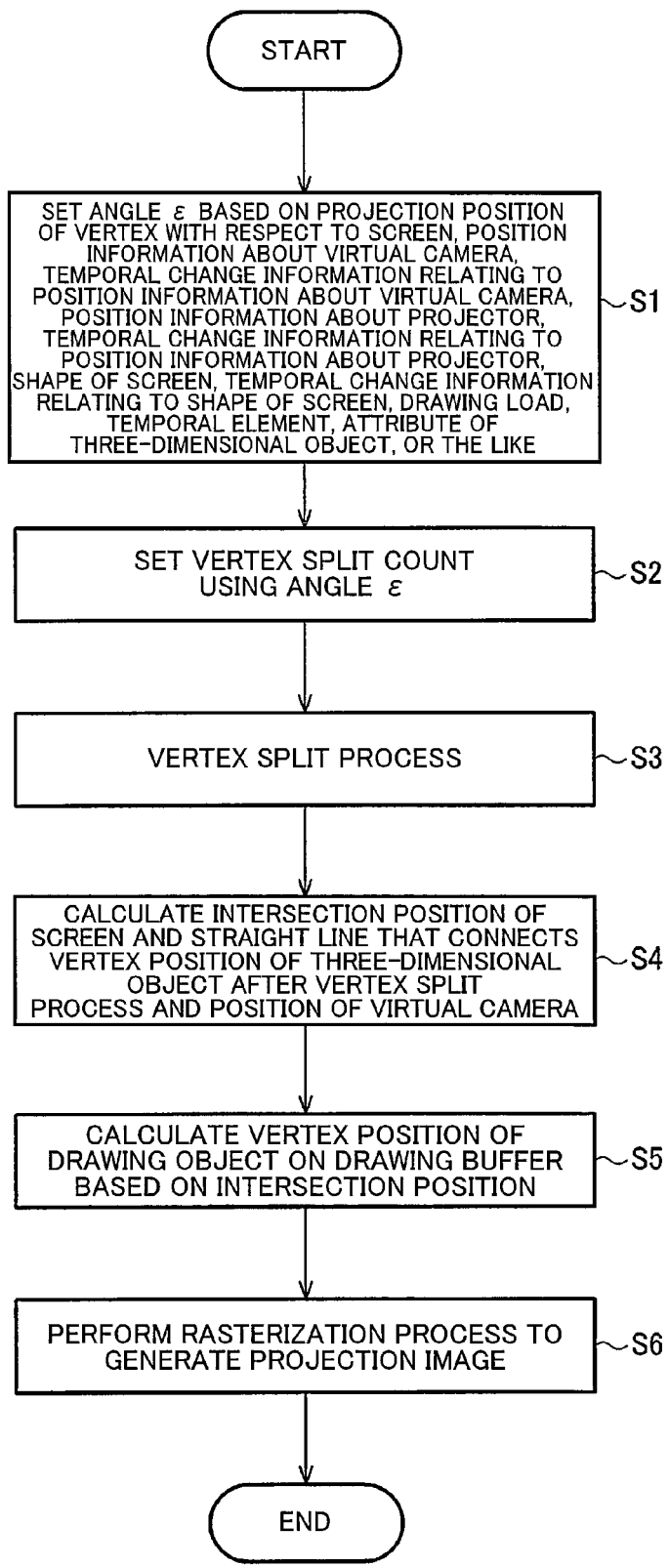
FIG. 17 is a flowchart illustrating a process according to one embodiment of the invention.

A detailed example of the process according to one embodiment of the invention is described below with reference to FIG. 17 (flowchart).

The angle $\epsilon$ is set based on the projection position of the vertex with respect to the screen, the position information about the virtual camera, the temporal change information about the position information about the virtual camera, the position information about the projector, the temporal change information about the position information about the projector, the shape of the screen, the temporal change information about the shape of the screen, the drawing load, the temporal element, the attribute of the three-dimensional object, or the like (step S1). The vertex split count is set based on the angle $\epsilon$ (step S2).

The vertex split process is performed using the vertex split count set in the step S2 (step S3). The intersection position of the screen and a straight line that connects the vertex position of the three-dimensional object after the vertex split process and the position of the virtual camera is calculated (step S4).

The vertex position of the drawing object on the drawing buffer is calculated based on the calculated intersection position (step S5). The rasterization process is performed based on the calculated vertex position to generate a projection image (step S6).

Figure 18A:
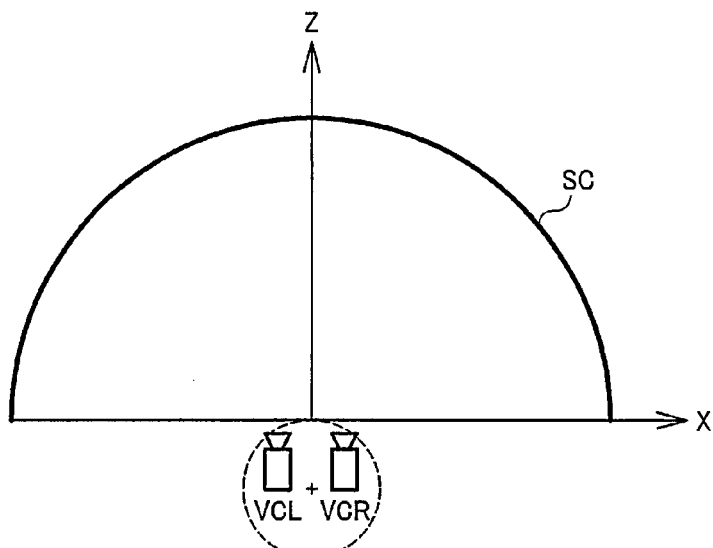
FIG. 18A to 18C are views illustrating a stereoscopic application example.

Note that the method according to the embodiments of the invention may also be applied when generating a stereoscopic projection image. When generating a stereoscopic projection image, a left-eye virtual camera VCL (first-viewpoint virtual camera in a broad sense) and a right-eye virtual camera VCR (second-viewpoint virtual camera in a broad sense) are provided (see FIG. 18A), for example. A projection image is generated by the above method using each of the left-eye virtual camera VCL and the right-eye virtual camera VCR to generate a stereoscopic projection image.

The position of the left-eye virtual camera VCL and the position of the right-eye virtual camera VCR may be set by detecting the position of the left eye and the position of the right eye of the player by head tracking or the like.

When it is impossible to detect the position of the left eye and the position of the right eye of the player, the viewpoint position of the player may be estimated based on the projection position of the three-dimensional object (drawing target), and the position of the left-eye virtual camera VCL and the position of the right-eye virtual camera VCR may be set corresponding to the estimated viewpoint position. For example, the position (viewpoint position) of the left-eye virtual camera VCL and the position (viewpoint position) of the right-eye virtual camera VCR may be changed corresponding to the projection position of the three-dimensional object (drawing target) (see FIGS. 18B and 18C).

Figure 18B:
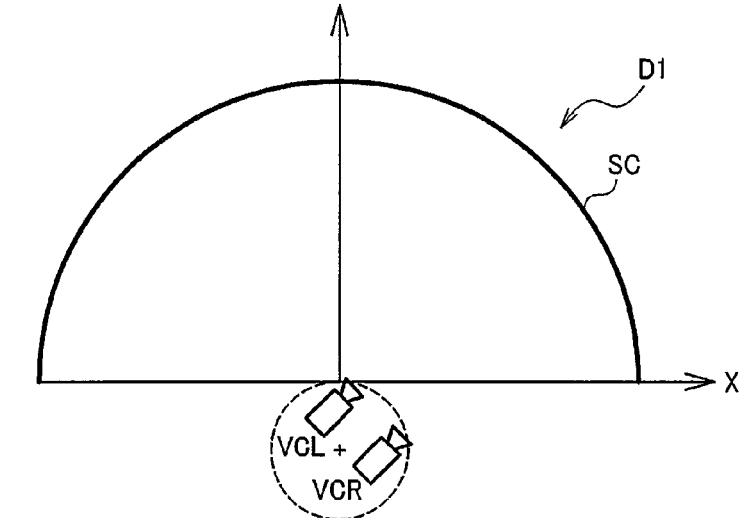

For example, when the three-dimensional object is projected at the projection position indicated by D1 in FIG. 18B, it is considered that the player (viewer) who observes the three-dimensional object turns his face toward the projection position indicated by D1. In this case, the position of the left-eye virtual camera VCL and the position of the right-eye virtual camera VCR are set as illustrated in FIG. 18B to generate a stereoscopic projection image.

Figure 18C:
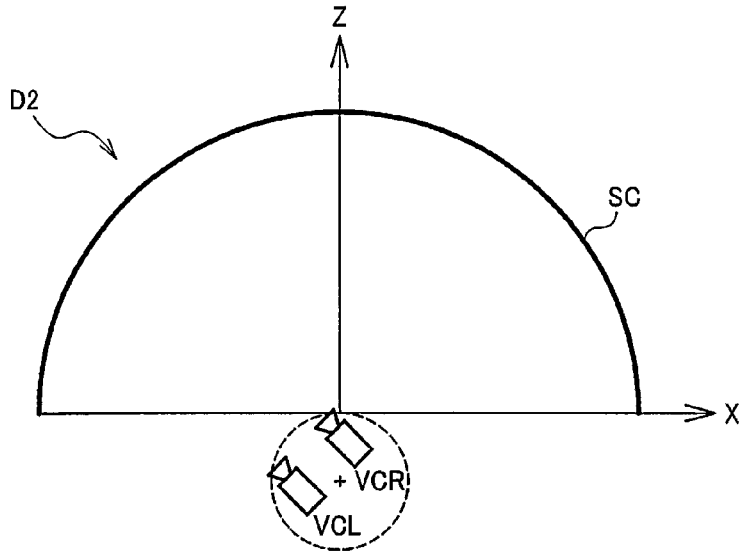

When the three-dimensional object is projected at the projection position indicated by D2 in FIG. 18C, it is considered that the player who observes the three-dimensional object turns his face toward the projection position indicated by D2. In this case, the position of the left-eye virtual camera VCL and the position of the right-eye virtual camera VCR are set as illustrated in FIG. 18C to generate a stereoscopic projection image. The above configuration makes it possible to generate an optimum projection image corresponding to the line-of-sight direction of the player, for example.

Examples of a means for observing the stereoscopic image include a glasses method (e.g., polarization method, time division method, or spectroscopic method), a naked-eye method, and the like. These methods have specific characteristics, and have advantages/disadvantages under different environmental conditions. An appropriate method may be used corresponding to the environmental conditions (e.g., the shape of the screen, information displayed on the screen, and the characteristics of interaction).

2.6 Real-Time Projection Mapping

A method that accurately generates projection mapping data from model data at a high speed is described below.

Figure 19A:
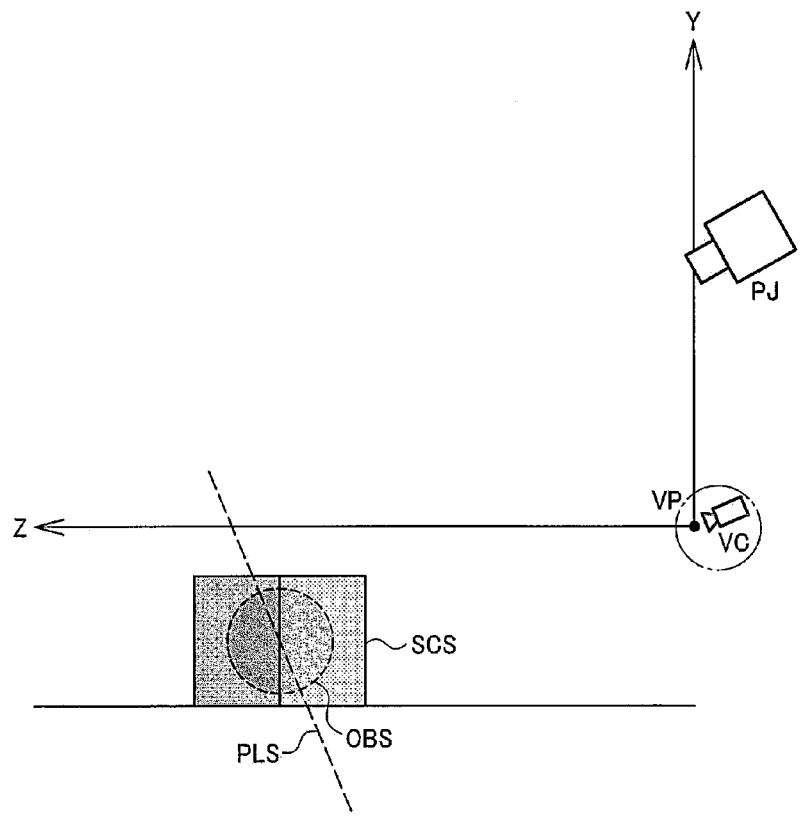
FIGS. 19A and 19B are views illustrating a method that generates projection mapping data from screen model data.
Figure 19B:
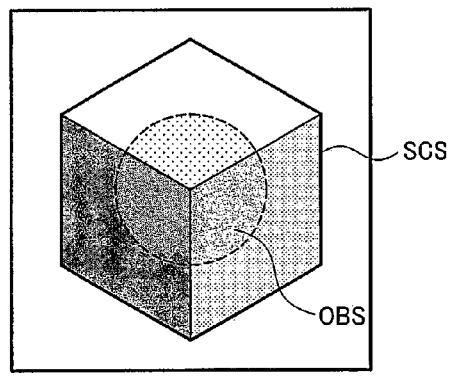

The model illustrated in FIG. 19A is used for convenience of explanation. The projection screen has a cubic shape. Note that the actual screen has a more complex shape. The above projection screen is referred to as "solid screen SCS". The virtual object OBS to be displayed is a spherical object, and is represented by a polygon mesh. The virtual object OBS is drawn as if the virtual object OBS were situated within the solid screen SCS (see FIG. 19B).

Since dome projection can normally be approximated by utilizing an ellipsoidal screen, and an ellipsoid formula is simple, it is easy to calculate the intersection point with the line of sight, the intersection point with the projection line (straight line) from the projector, and the like. However, projection mapping normally has a problem in that the solid screen shape model cannot be represented by a simple numerical expression. When implementing dome projection, it may be difficult to correct distortion that occurs in an area in which a shape differing from an ellipsoid is applied due to production reasons or the like.

In order to solve the above problem, adjustments may normally be made while actually projecting a projection image when implementing projection mapping onto a building or the like.

For example, a substitute plane for projecting a virtual object is appropriately selected in the same manner as in the case of implementing dome projection described above with reference to FIG. 5. The shape of the solid screen is rendered in the substitute plane from the position of the player (viewer) to generate an image. In this case, the subsequent adjustments are facilitated by generating an image in which the edges of the solid screen are brightly highlighted.

The resulting image is projected onto the screen from the projector. In this case, the edges projected onto the solid screen are misaligned when observed from the position of the player. Therefore, the vertices on the image are moved using editing software so that the edges are accurately aligned. Data in which UV coordinates correspond to the vertices of the mesh is thus obtained (see "2.1 Per-pixel distortion correction method") (hereinafter referred to as "mesh-like UV map"). An image obtained by rendering the CG image using the substitute plane as the projection plane, and transforming the image using the mesh-like UV map is projected using the projector.

The above method has a problem in that preparation takes time since adjustments are necessary each time the image is projected. When the solid screen has a complex irregular shape, preparation takes more time since the number of vertices used for adjustments increases. Moreover, the accuracy of correction on the complex irregular area decreases.

In order to solve the above problems, one embodiment of the invention provides a method that can accurately correct distortion at a high speed without performing manual vertex alignment when the shape of the solid screen SCS is known in advance based on shape data. An example in which the method is applied to a per-vertex distortion correction process (see FIG. 9) is described below. The method is implemented by sequentially performing the following steps (1), (2), (3), (4), and (5) (see FIG. 20).

(1) The virtual camera VC is disposed at the position of the representative viewpoint of the player, and the substitute plane PLS is set. The shape of the solid screen SCS is rendered using a Z-buffer method. Since the distance from the position of the virtual camera VC to the solid screen SCS is stored in the Z-buffer as a depth image, the spatial coordinates of the surface of the solid screen SCS are calculated from the depth image. The spatial coordinates are stored as a texture.

(2) Each vertex (X, Y, Z) of the virtual object OBS is transformed using the same projective transformation matrix as that used during rendering (see the step (1)) to calculate the position (X1, Y1) on the texture stored in the step (1).

(3) The spatial coordinates of the intersection point of each vertex and the solid screen SCS are determined by referring to the spatial coordinates on the texture corresponding to the position (X1, Y1).

(4) A straight line LPS that connects the intersection point calculated in the step (3) and the projector PJ is calculated, and the position (X, Y) on the drawing buffer corresponding to the straight line LPS is calculated.

(5) The position of each vertex is transformed into the position (X, Y) on the drawing buffer, and transferred to the rasterizer. The rasterizer performs a normal rasterization process to generate a projection image, and the projection image is projected from the projector PJ. In this case, a tessellation process (vertex split process) is appropriately performed on the polygon of the virtual object OBS.

Figure 20:
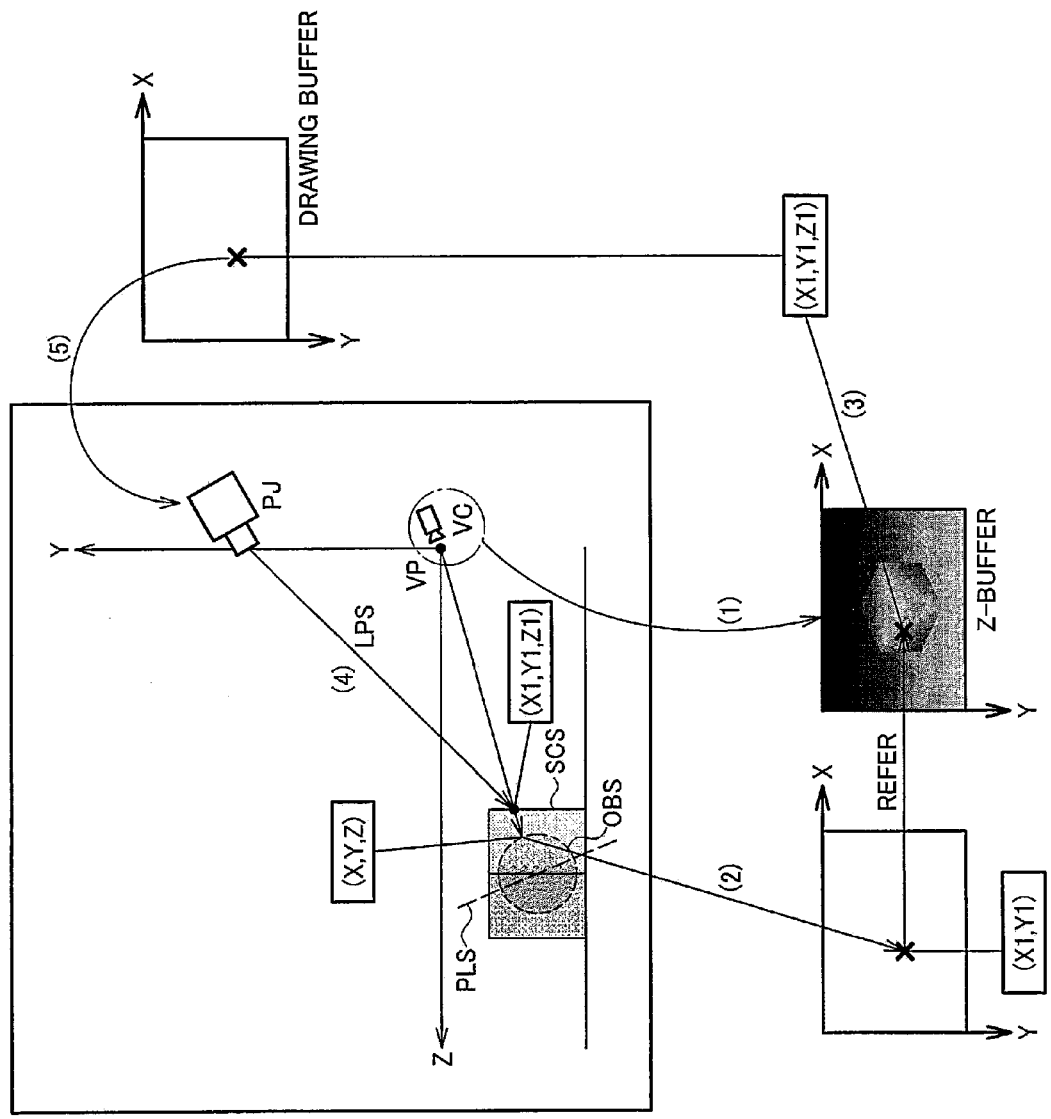
FIG. 20 is a view illustrating a method that generates projection mapping data from screen model data.

According to the method illustrated in FIG. 20, a depth image (Z-buffer texture) in which the depth value (Z-value) is set corresponding to each pixel or each vertex of the screen model object is generated by drawing the screen model object (SCS) corresponding to the shape of the screen in the viewpoint coordinate system of the virtual camera (VC). The first and second coordinates ((X, Y)) of the vertex of the three-dimensional object (OBS) are transformed using the projective transformation matrix with respect to the viewpoint coordinate system (coordinate system of the virtual camera VC), and the intersection position with the screen (SCS) is calculated by referring to the depth value of the depth image (Z-buffer texture) based on the first and second coordinates ((XL Y1)) after transformation.

Note that it is difficult to achieve accurate correction in the actual situation due to a shift in position or angle caused by placement of the solid screen, a shift in position of the player, or a shift in position of the projector. Therefore, it is desirable to render an image in which the edges of the solid screen are highlighted, and make adjustments while projecting the image from the projector (see above).

When using the method according to one embodiment of the invention, however, it is possible to make adjustments using a small number of parameters (e.g., the position and the direction of the solid screen, the position and the direction of the projector, and the position of the representative viewpoint of the player) when the shape data relating to the solid screen is accurate to a certain extent. In particular, when the solid screen has a complex shape (i.e., has a large number of vertices), it is possible to make adjustments with significantly reduced time as compared with the case of moving the vertices (adjustment points) one by one.

A method has been known that measures the shape of the projection screen using a range finder (sensor) or the like to generate shape data, and corrects distortion in the same manner as described above. According to this method, however, it is difficult to acquire accurate shape data due to a measurement error, and achieve accurate distortion correction. The accuracy of the shape data may be improved by taking more time in measurement. However, it is difficult to obtain accurate distortion correction data in real time when the shape of the projection screen changes, for example. When accurate shape data or motion information has been obtained in advance, it is possible to implement real-time distortion correction (i.e., projection mapping) by utilizing the method according to one embodiment of the invention.

The method according to one embodiment of the invention illustrated in FIG. 20 has an advantage in that the adjustment map generation process that takes time can be achieved instantaneously (i.e., by performing a single rendering operation). For example, the method according to one embodiment of the invention is advantageous when one of the solid screen, the projector, and the player moves, or when two or more of the solid screen, the projector, and the player move at the same time.

The following applications may be implemented when the positions and the directions of the solid screen, the projector, and the player can be accurately determined using a motion sensor or a head tracking system.

For example, a figure, a plastic model, or the like is used as the solid screen, and placed on a rotary stage. A corrected image corresponding to the rotation angle is projected onto the solid screen.

A robot is used as the solid screen. An accurate shape (vertex position) is calculated from the joint angle or the like when the robot has made a motion, and a corrected image corresponding to the accurate shape is projected onto the solid screen.

A plurality of projectors are disposed relative to the solid screen so that a shadow does not occur even when the player moves around the solid screen. A head tracking process is performed on the player, and a corrected image corresponding to the motion of the player is projected onto the solid screen so that a natural image can be observed even when the player moves around the solid screen.

When implementing an attraction in which the player illuminates an object situated in a room while holding a flashlight-type projector (or wearing a helmet provided with a headlamp-type projector), a corrected image corresponding to the position of the player and the position/direction of the projector is projected onto the object.

Although FIG. 20 illustrates an example in which the method that generates the projection mapping data from the model data is applied to the per-vertex distortion correction method (i.e., the method that corrects distortion corresponding to each vertex of the three-dimensional object), the method may also be applied to the per-pixel distortion correction method (i.e., the method that corrects distortion corresponding to each pixel of the drawing buffer) described above with reference to FIG. 4.

Although only some embodiments of the invention have been described in detail above, those skilled in the art would readily appreciate that many modifications are possible in the embodiments without materially departing from the novel teachings and advantages of the invention. Accordingly, all such modifications are intended to be included within scope of the invention. Any term cited with a different term having a broader meaning or the same meaning at least once in the specification and the drawings can be replaced by the different term in any place in the specification and the drawings. The vertex split count setting method, the vertex split processing method, the vertex position calculation method, the angle ($\epsilon$) setting method, and the like are not limited to those described in connection with the above embodiments. Methods equivalent to the above methods are included within the scope of the invention. The invention may be applied to various games. The invention may be applied to various image generation systems such as an arcade game system, and a large-scale attraction system in which a number of players participate.

What is claimed is:

1. An image generation system comprising:
a memory that stores information; and
a processor that operates based on the information stored in the memory, the processor comprising hardware, the processor being configured to implement:
a vertex split count setting process that sets a vertex split count;
a vertex split process that performs a vertex split process on a three-dimensional object in an object space using the vertex split count set by the vertex split count setting process;
a vertex position calculation process that calculates an intersection position of a projection screen and a straight line that connects a vertex position of the three-dimensional object after the vertex split process and a position of a virtual camera, and calculates a vertex position of a drawing object corresponding to the three-dimensional object on a drawing buffer based on the calculated intersection position; and
a drawing process that draws the drawing object on the drawing buffer based on the calculated vertex position of the drawing object to generate a projection image,
wherein a first vertex and a second vertex form a line segment included in the three-dimensional object subjected to the vertex split process,
wherein $\theta$ is an angle formed by a first straight line and a second straight line, the first straight line connecting the first vertex and the position of the virtual camera, the second straight line connecting the second vertex and the position of the virtual camera,
wherein m is the vertex split count,
wherein $\epsilon$ is used as a standard for setting the vertex split count,
wherein $\delta$ is an angle under which a size of a pixel of the projection image on the screen is seen from the position of the virtual camera,
wherein the vertex split count setting process sets the vertex split count m so that $(\theta/m) < \epsilon$ is satisfied, and
wherein the vertex split count setting process sets the vertex split count m using the angle $\epsilon$ that is set with respect to the angle $\delta$.

2. The image generation system as defined in claim 1,
wherein the vertex split count setting process sets the vertex split count m based on the angle $\theta$.

3. The image generation system as defined in claim 2,
the vertex split count setting process sets the vertex split count m to a first split count m1 when the angle $\theta$ is a first angle $\theta$1, and sets the vertex split count m to a second split count m2 (m2≤m1) when the angle $\theta$ is a second angle $\theta$2 ($\theta$2<$\theta$1).

4. The image generation system as defined in claim 2,
the vertex split count setting process changes the vertex split count m with respect to the angle $\theta$ corresponding to at least one of a projection position of a vertex of the three-dimensional object subjected to the vertex split process with respect to the screen, position information about the virtual camera, temporal change information about the position information about the virtual camera, position information about a projector, temporal change information about the position information about the projector, a shape of the screen, temporal change information about the shape of the screen, a drawing load, a temporal element, and an attribute of the three-dimensional object.

5. The image generation system as defined in claim 1,
the vertex split count setting process changes the angle $\epsilon$ corresponding to at least one of a projection position of a vertex of the three-dimensional object subjected to the vertex split process with respect to the screen, position information about the virtual camera, temporal change information about the position information about the virtual camera, position information about a projector, temporal change information about the position information about the projector, a shape of the screen, temporal change information about the shape of the screen, a drawing load, a temporal element, and an attribute of the three-dimensional object.

6. The image generation system according to claim 1, wherein the screen being a screen including one curved surface or a plurality of surfaces.

7. An image generation method comprising:

performing a vertex split count setting process that sets a vertex split count;

performing a vertex split process on a three-dimensional object in an object space using the vertex split count set by the vertex split count setting process;

calculating an intersection position of a projection screen and a straight line that connects a vertex position of the three-dimensional object after the vertex split process and a position of a virtual camera, and calculating a vertex position of a drawing object corresponding to the three-dimensional object on a drawing buffer based on the calculated intersection position; and drawing the drawing object on the drawing buffer based on the calculated vertex position of the drawing object to generate a projection image, wherein a first vertex and a second vertex form a line segment included in the three-dimensional object subjected to the vertex split process, wherein $\theta$ is an angle formed by a first straight line and a second straight line, the first straight line connecting the first vertex and the position of the virtual camera, the second straight line connecting the second vertex and the position of the virtual camera, wherein m is the vertex split count, wherein $\epsilon$ is used as a standard for setting the vertex split count, wherein $\delta$ is an angle under which a size of a pixel of the projection image on the screen is seen from the position of the virtual camera, wherein the vertex split count setting process sets the vertex split count m so that $(\theta/m)<\epsilon$ is satisfied, and wherein the vertex split count setting process sets the vertex split count m using the angle $\epsilon$ that is set with respect to the angle $\delta$.

8. A non-transitory computer-readable information storage medium storing a program that causes a computer to execute the image generation method according to claim 7.

* * * * *